July 6, 1965 R. N. COX ETAL 3,193,138
DISPENSER WITH ARTICLE ELEVATOR
Filed Sept. 5, 1963 15 Sheets-Sheet 1

Robert N. Cox,
Leonard A. Ficken,
Inventors.
Koenig, Pope, Senniger and Powers,
Attorneys.

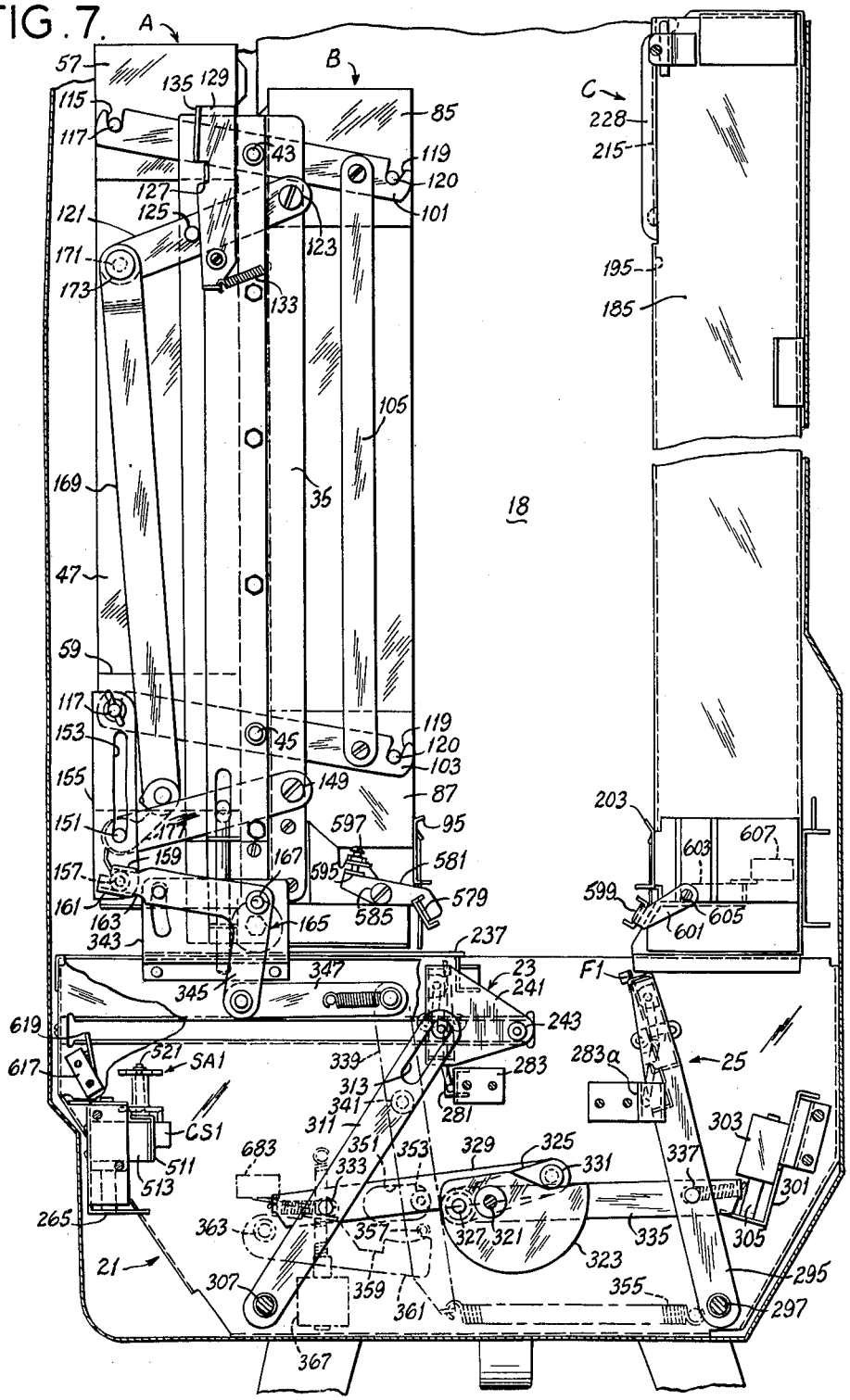

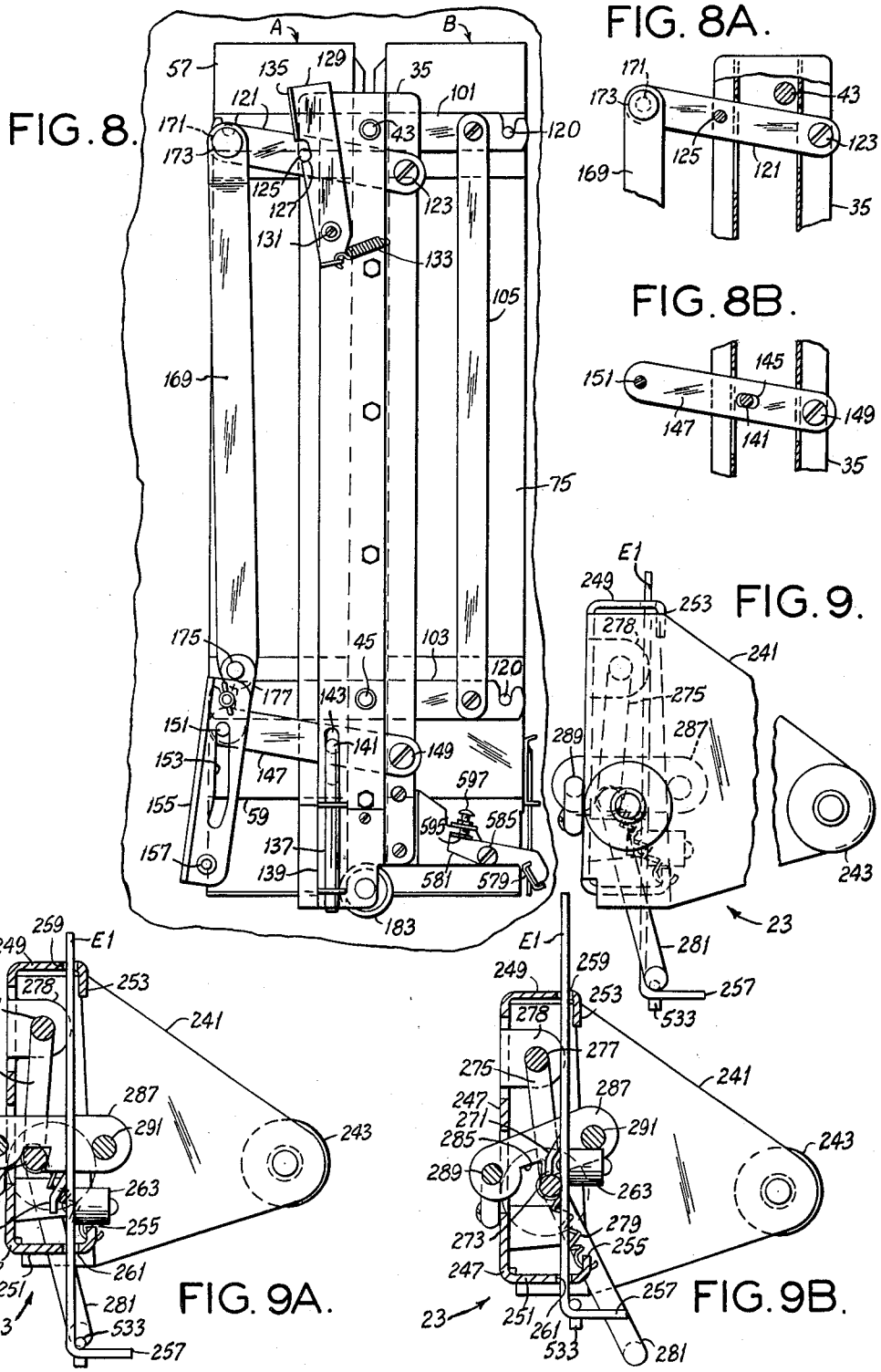

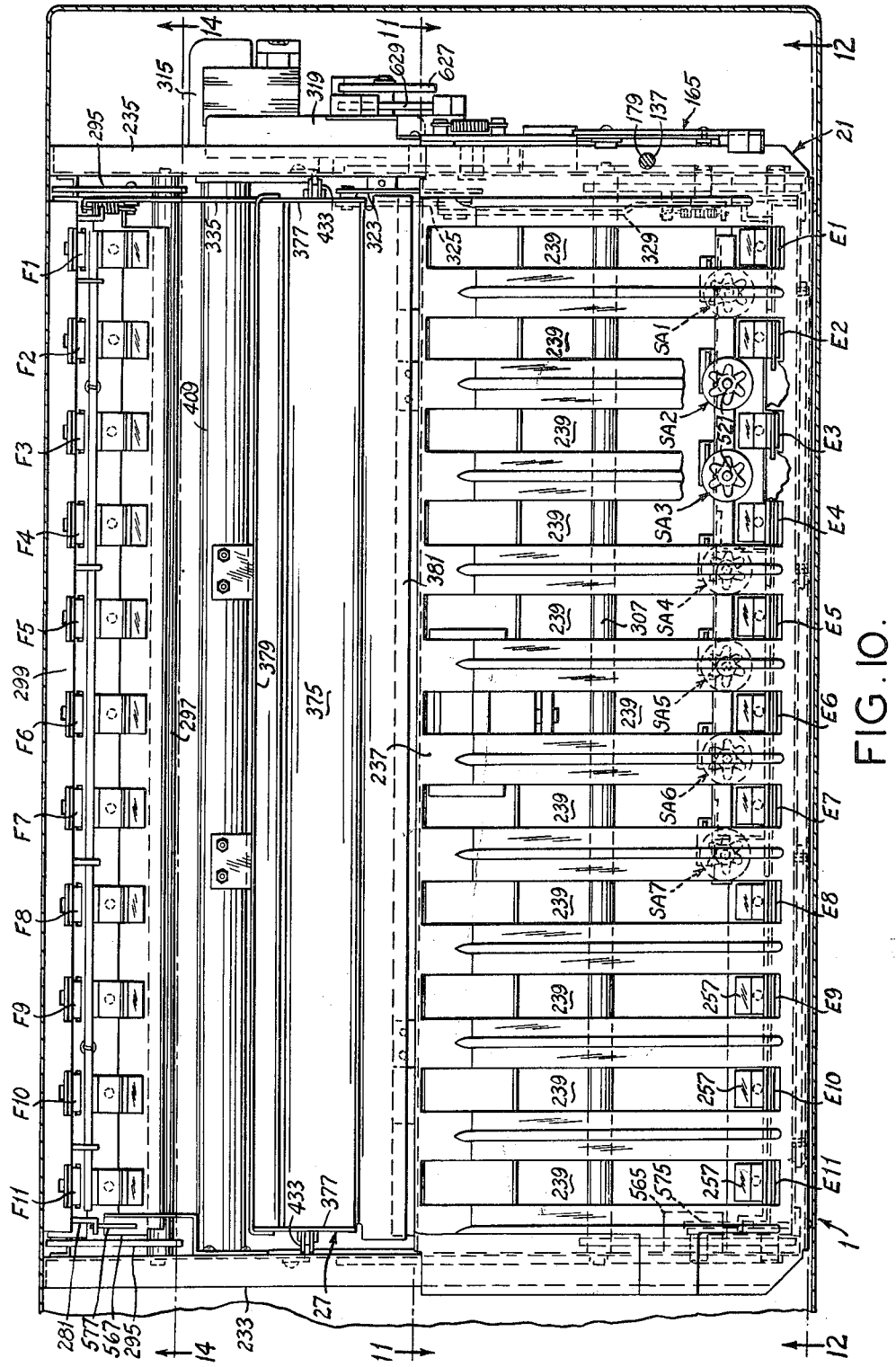

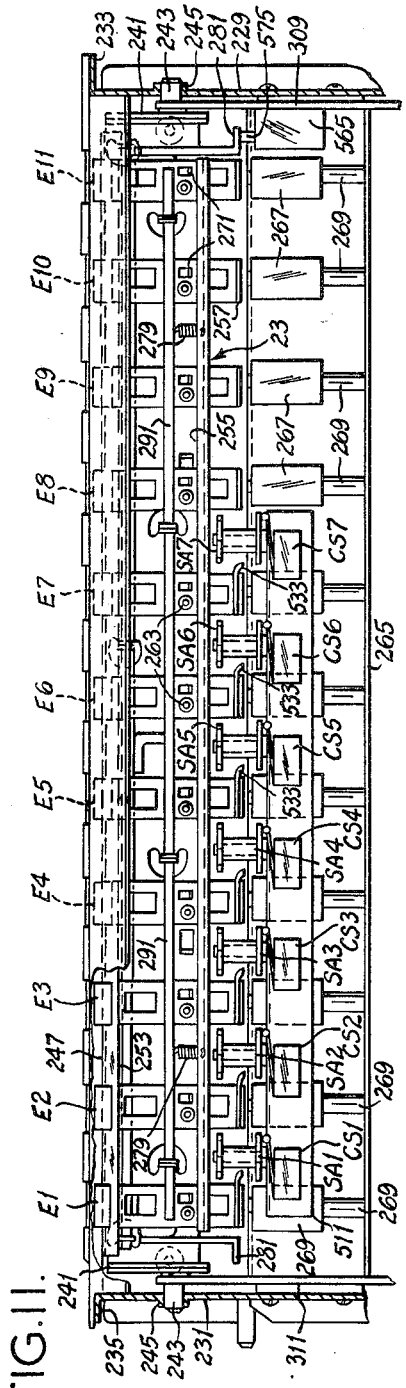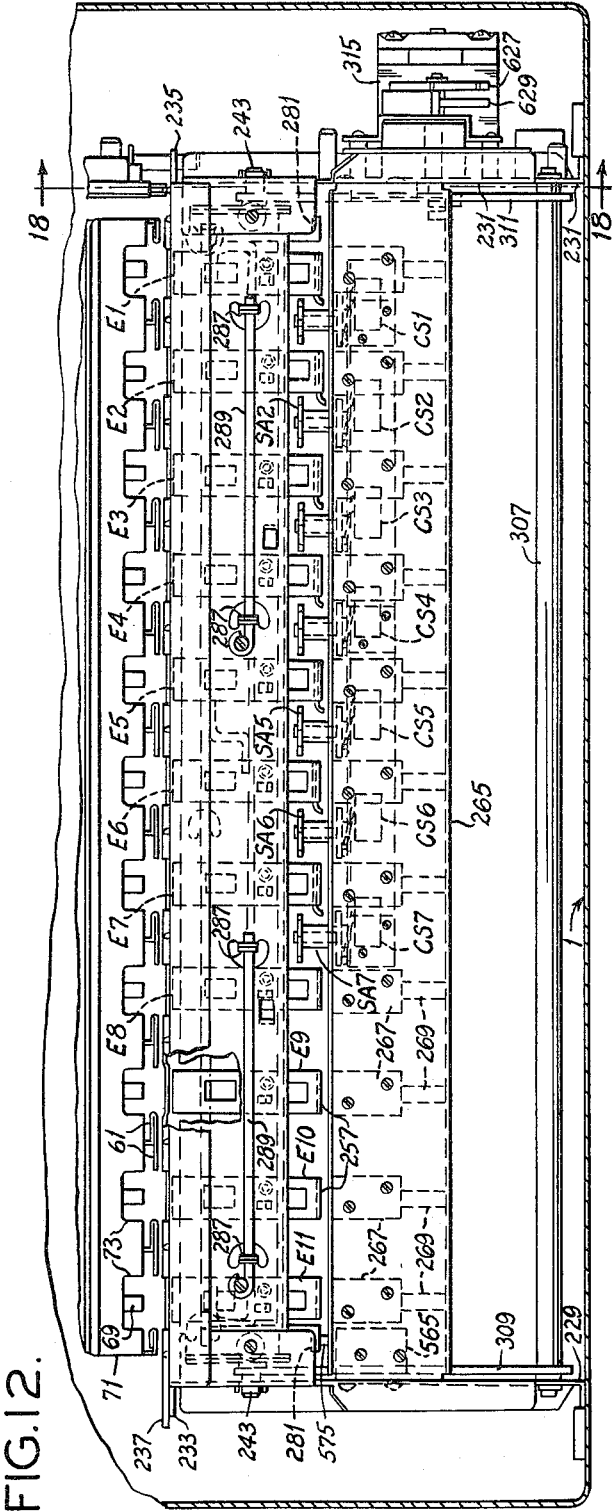

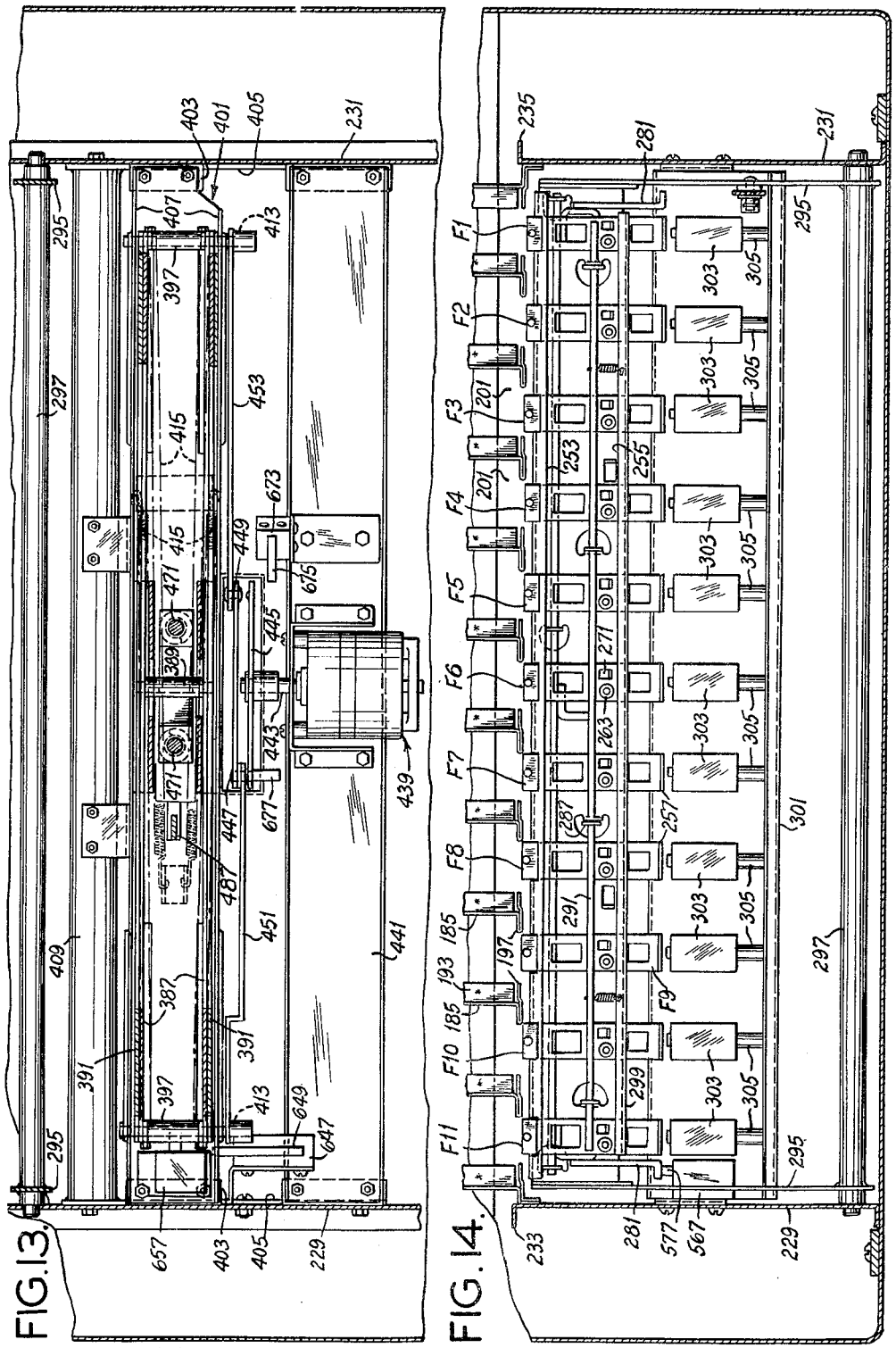

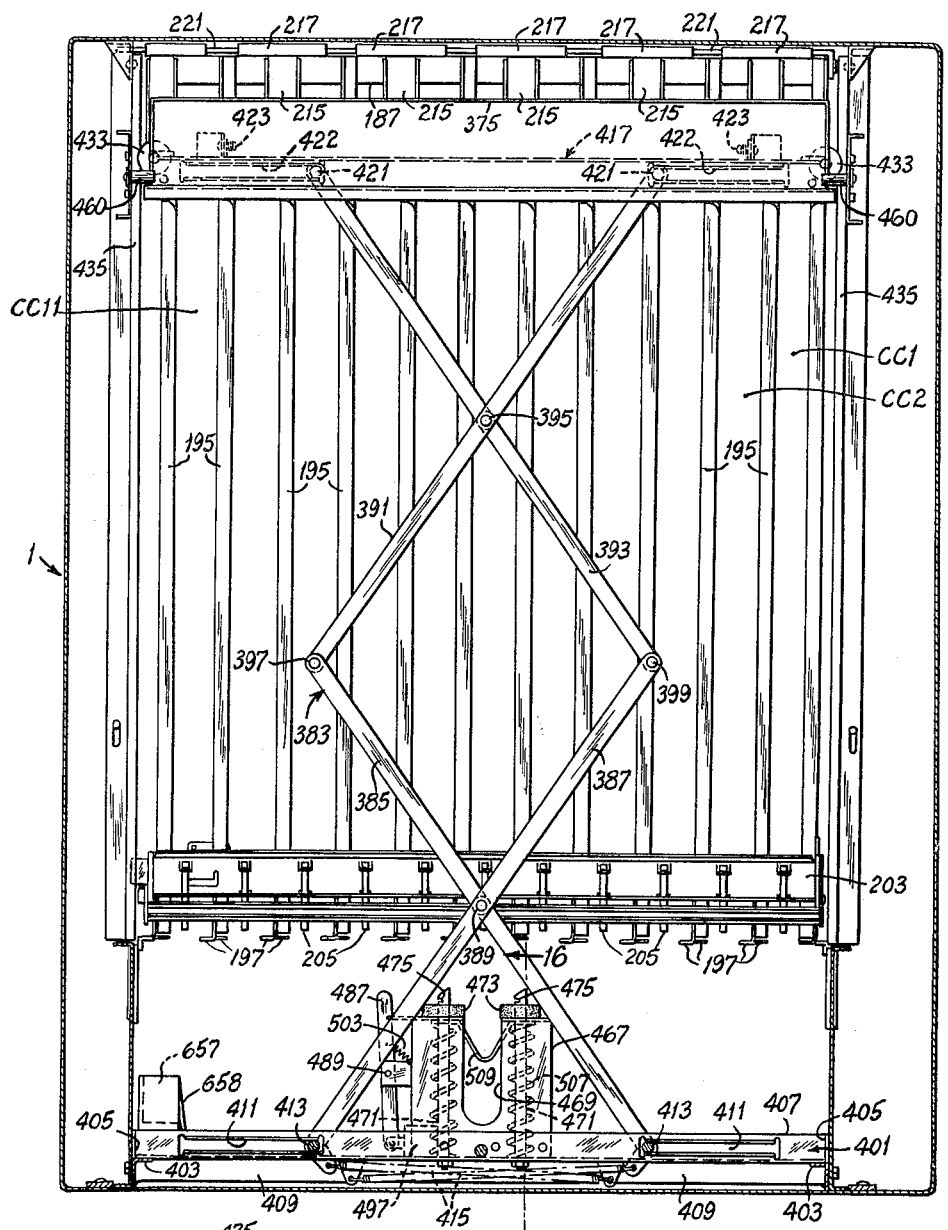
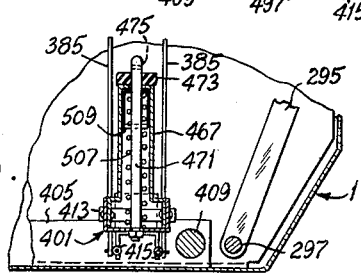
FIG. 15.
FIG. 16.

July 6, 1965

R. N. COX ETAL 3,193,138

DISPENSER WITH ARTICLE ELEVATOR

Filed Sept. 5, 1963

United States Patent Office 3,193,138
Patented July 6, 1965

3,193,138
DISPENSER WITH ARTICLE ELEVATOR
Robert N. Cox, Bridgeton, and Leonard A. Ficken, St. Louis County, Mo., assignors, by mesne assignments, to Universal Match Corporation, Ferguson, Mo., a corporation of Delaware
Filed Sept. 5, 1963, Ser. No. 306,924
32 Claims. (Cl. 221—116)

This invention relates to vendors, and more particularly to vendors for packs of cigarettes.

Among the several objects of the invention may be noted the provision of an improved vendor, and particularly a vendor for packs of cigarettes, of the so-called console cabinet type, wherein delivery of packs is effected to a delivery station at the front of the cabinet and adjacent the top of the cabinet at a level convenient for removal of a pack from the delivery station by a purchaser without having to stoop over; the provision of a vendor such as described having a plurality of columns for stocking a plurality of brands of cigarettes, and a corresponding plurality of ejectors for ejecting the lowermost packs in the columns, the delivery station being above the bottom of the columns, and having an elevator for receiving a pack ejected from any column and delivering it to the delivery station, with the arrangement such as to minimize the possibility of jamming of the elevator by vandals; the provision of a vendor such as described having a relatively large number of columns for stocking a relatively large number of brands (twenty-two columns for twenty-two brands, for example) and having a relatively high capacity for packs of each brand and an augmented capacity for packs of the faster selling brands, while being of relatively compact size; the provision in a vendor such as described of an improved shift column arrangement to obtain the augmented capacity for packs of the faster selling brands, this arrangement involving a pair of columns for each fast-selling brand with alternate vending of packs from the columns of the pair; the provision in a vendor such as described of an improved and simplified ejector-actuating arrangement comprising means carrying the ejectors for movement through an ejecting stroke and a return stroke, with the ejectors carried thereby for movement between a lowered retracted position and a raised ejecting position, and ejector lifters which are fixed relative to said means rather than being movable with said means; and the provision in a vendor such as described of an improved fast-acting elevator arrangement for delivering an ejected pack to the delivery station. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated, FIG. 1 is a front elevation of a vendor of this invention, showing the cabinet of the vendor with the front door thereof closed;

FIG. 7 is a vertical section taken generally on line 7—7 of FIG. 3, with the elevator omitted, showing the ejector carriers at the end of an ejecting stroke, and showing the first bank of columns up and the second bank down;

FIG. 8 is a fragmentary view showing the first and second banks of columns latched in an intermediate position;

FIGS. 8A and 8B are sections showing details of certain parts shown in FIG. 8;

FIG. 9 is an end view of a first ejector carrier or carriage of the vendor;

FIG. 9A is a cross section of the carrier or carriage shown in FIG. 9;

FIG. 9B is a view corresponding to FIG. 9A showing a moved position of parts;

FIG. 10 is a horizontal section taken generally on line 10—10 of FIG. 6, showing the top of an ejector-elevator assembly of the vendor;

FIG. 11 is a vertical section taken generally on line 11—11 of FIG. 10;

FIG. 12 is a vertical section taken generally on line 12—12 of FIG. 10, showing the front of the ejector-elevator assembly;

FIG. 13 is a horizontal section taken generally on line 13—13 of FIG. 5;

FIG. 14 is a vertical section taken generally on line 14—14 of FIG. 10;

FIG. 15 is a vertical section taken generally on line 15—15 of FIG. 2, on a smaller scale than FIG. 2, showing the elevator raised;

FIG. 16 is a detail section taken generally on line 16—16 of FIG. 15;

Corresponding reference characters indicate corresponding parts throughout the several views of the drawings.

A vendor of this invention particularly adapted for vending packs of cigarettes is shown herein, but it will be understood that the principles of the invention may be utilized for vending various items of merchandise other than cigarettes. The vendor will hereinafter be described as vending packs of cigarettes, and, as will appear, is adapted selectively to vend different brands of cigarettes, in both standard and long length packages.

Figure 1:
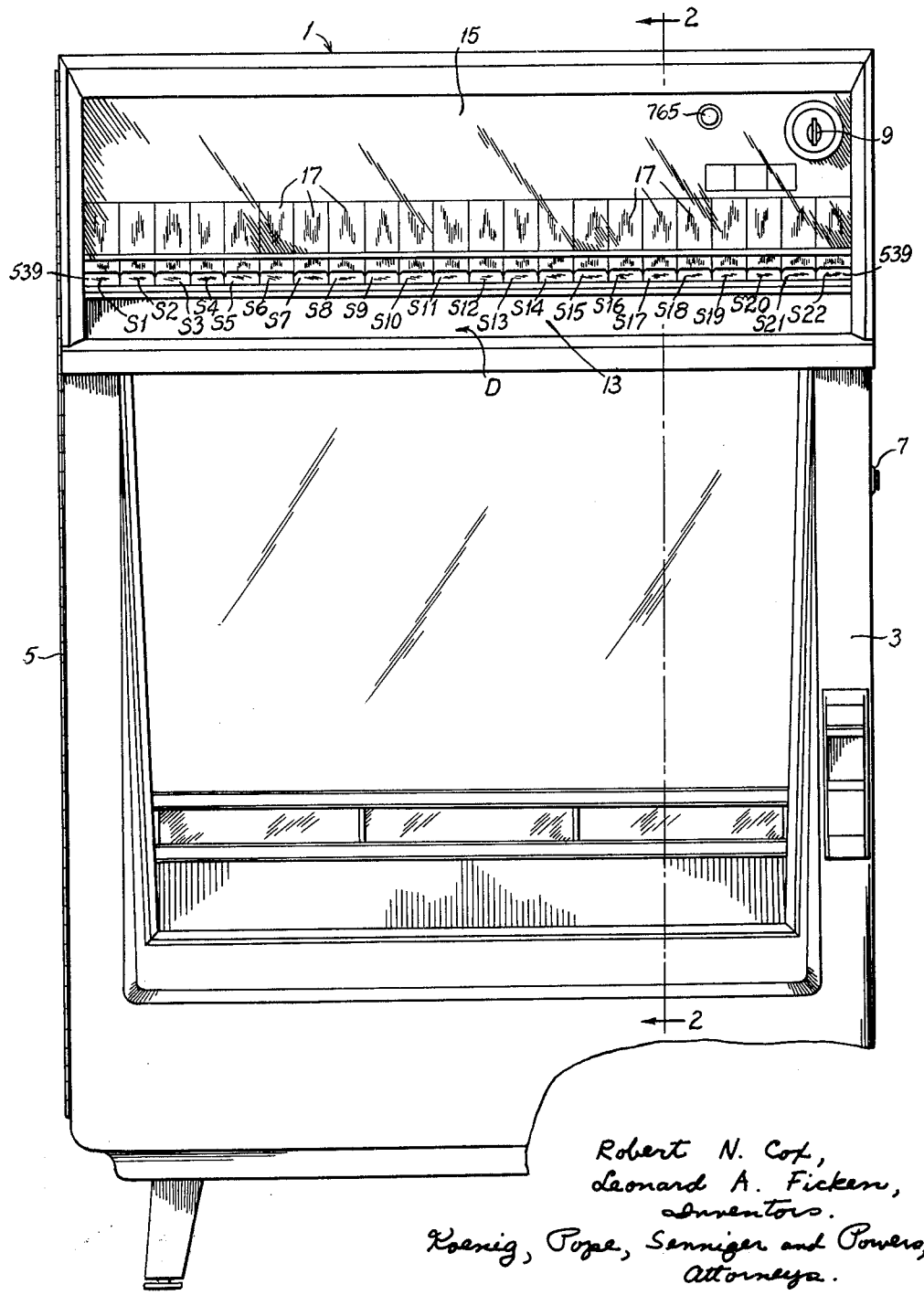
Figure 2:
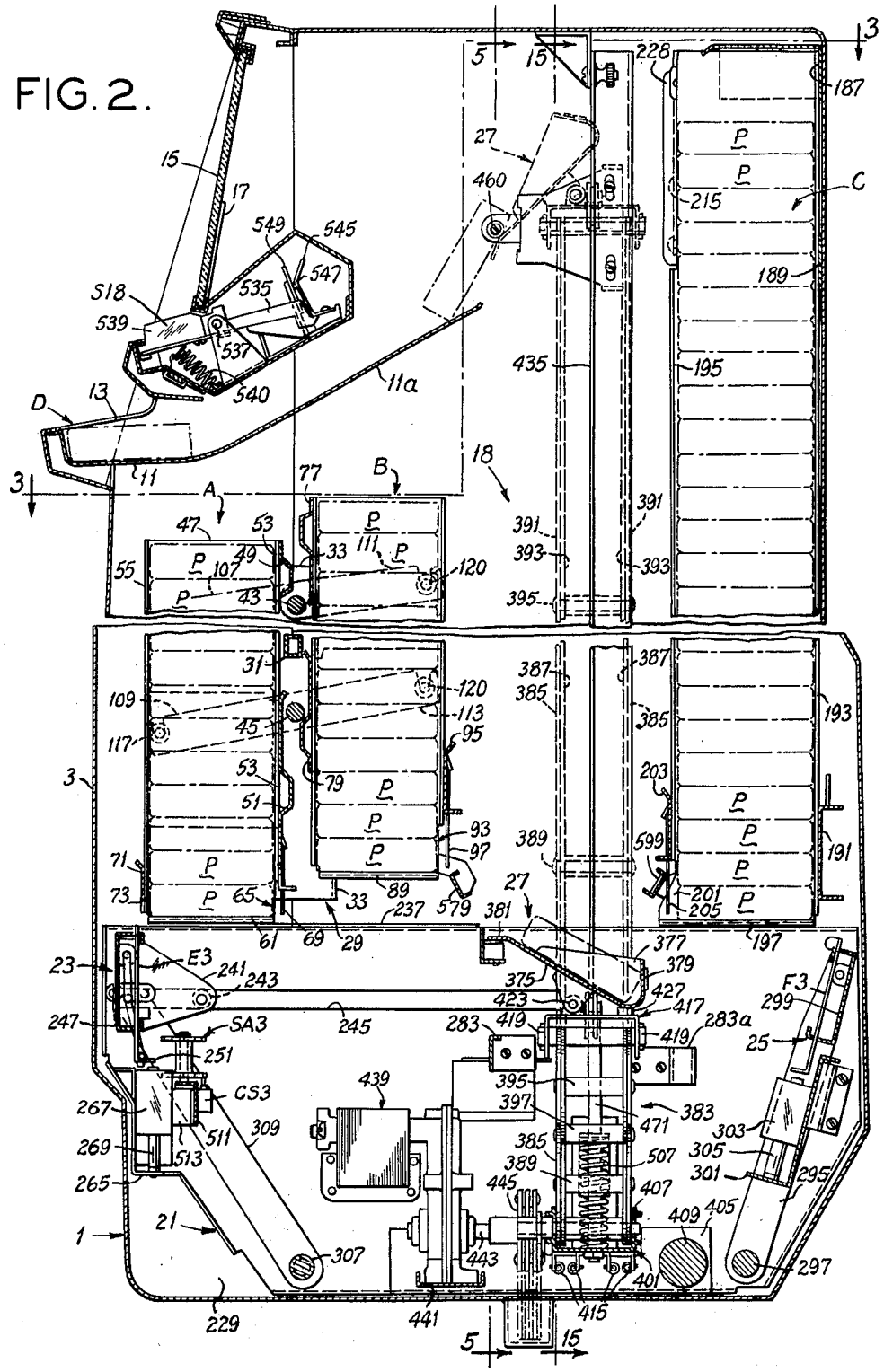
FIG. 2 is a vertical section taken generally on line 2—2 of FIG. 1, on a larger scale than FIG. 1, and with parts broken away to reduce the height of the view, showing certain ejector carriers of the vendor in their retracted position, showing in solid lines an elevator of the vendor in its lowered position, and showing in dotted lines the elevator in raised position.

Referring first to FIGS. 1 and 2, the vendor comprises a console cabinet 1, i.e., a cabinet of relatively low height, its top being below eye level. The cabinet has a front door 3 pivoted to swing on a vertical hinge 5 at the left of the cabinet as viewed from the front. At 7 is indicated a latch for locking the door in closed position. In the door is a coin inlet 9 for receiving coins of different denominations, the coins dropping through the usual coin chute (not shown) to the usual coin-handling apparatus. It will be understood that the coin-handling apparatus includes a totalizer for registering the total value of coins deposited, and means for controlling the vending operation, and may include a change maker. Each pack vended is delivered to a delivery station indicated at D in FIGS. 1 and 2 which is located near the top of the front door 3 at a level convenient for removal of a pack by a purchaser without requiring the purchaser to bend over. At this high level delivery station there is a delivery pan 11 which projects out through a delivery opening 13 in the door, the opening and the pan extending substantially the full width of the door. The pan has an inclined rearward end 11a down which packs may slide through the opening to the front of the pan. Above the delivery opening, the door carries a row of push button selector switches, each generally designated by the reference character S, one for each of the different brands of cigarettes stocked in the vendor, each operable by a purchaser upon deposit of an appropriate amount in coin for effecting delivery to the pan of a pack of cigarettes of the respective brand. As shown, there are twenty-two such selector switches, for twenty-two different brands, and they are specially designated S1–S22. Above the row of switches S1–S22 the door has a window 15 behind which is a display of the brands of cigarettes stocked in the vendor. This includes means for holding miniature representations 17 of the faces of packs of different brands, each being located directly above the push button of a respective switch S1–S22.

Packs of cigarettes to be vended are stocked in the cabinet in columns arranged in three banks, each of which extends transversely of the cabinet, the columns in each bank being located side-by-side in the respective bank. The first bank is designated in its entirety by the reference character A, and the columns thereof are generally designated AC (see particularly FIGS. 2 and 3). As shown, there are eleven columns in bank A, and they are specially designated AC1 to AC11 from right to left. Bank A is located at the front of the cabinet. The second bank is designated in its entirety by the reference character B, and the columns thereof are generally designated BC. As shown, there are seven columns in the second bank, and these are specially designated BC1 to BC7 from right to left. Column BC1 is located directly rearward of column AC1, column BC2 is located directly rearward of column AC2, etc. The third bank of columns is designated in its entirety by the reference character C, and the columns thereof are generally designated CC. It is located toward the rear of the cabinet, spaced rearward of the second bank B. As shown, there are eleven columns in the rear bank, and these are specially designated CC1–CC11 from right to left. Each column in the first and second banks A and B is adapted to hold a stack of packs P and each is adapted for rearward ejection of the lowermost pack of the stack therein toward the space 18 between banks B and C. Each column in the third bank C is adapted to hold a stack of packs and each is adapted for forward ejection of the lowermost pack of the stack therein toward the space 18. Each of columns BC1–BC7 of the second bank B is paired with a respective column AC1–AC7 of the first bank, and each respective pair of columns AC1–BC1, AC2–BC2, etc. of the first and second banks A and B is adapted to be stocked with identical packs. That is, pair AC1–BC1 may be stocked with Pall Malls, pair AC2–BC2 with Chesterfields, etc. Usually these paired columns are stocked with the faster selling brands.

It will be observed that since there are only seven columns in bank B, there is an extra space 18a behind columns AC8–AC11 of bank A. This space is utilized for a book match dispenser (not shown).

Figure 19:
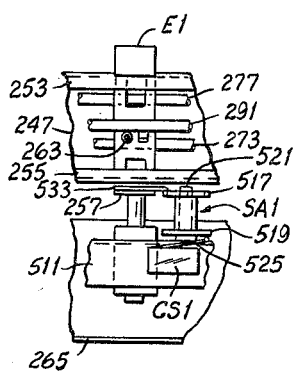
FIG. 19 is a detail view showing an ejector in raised position.

Means is provided for selectively ejecting the lowermost pack rearward from one or the other of each column of any of the seven pairs AC1–BC1, AC2–BC2 etc. of the first and second banks A and B, and from any one of the single front-bank columns AC8–AC11. This ejection means is incorporated in an assembly designated in its entirety by the reference numeral 21, which is mounted on the bottom of the cabinet, and which may be bodily removed in toto from the cabinet if desired. Generally, the stated ejection means comprises a slidable carrier or carriage designated in its entirety by the reference numeral 23 and a plurality of rearward-acting ejectors, each generally designated by the reference character E carried by the carriage, one for each pair of columns AC1–BC1, AC2–BC2, and one for each of the single front-bank columns AC8–AC11 (see FIGS. 2, 7 and 11). There are eleven ejectors E in all, and these eleven ejectors are specially designated E1–E11 from right to left. Each ejector E is carried by the carriage 23 for movement between a lowered retracted position (see FIGS. 2 and 9A) and a raised ejecting position (see FIGS. 9B and 19). The carriage 23 is slidable rearward from a forward retracted position to move rearward any ejector which may be raised thereby to eject the lowermost pack from one or the other of the two columns AC1–BC1, AC2–BC2 etc. of the respective pair of columns, or from a column AC8–AC11. See FIG. 2 showing carriage 23 in retracted position, and FIG. 7 showing it moved rearward through an ejecting stroke.

The first and second banks A and B of columns are located above assembly 21 toward the front thereof, and each is shiftable between a lowered position for ejection of the lowermost pack of a column therein by the respective ejector E and a raised retracted position clear of all the ejectors E. As will appear, means is provided for effecting reverse shifting of the first and second banks A and B for vending packs alternately from the columns of each pair AC1–BC1, AC2–BC2 etc. on successive ejections by the respective ejector E.

Means is provided for selectively ejecting forward the lowermost pack from each column of the third bank C. Generally, this comprises a pivoted carrier designated in its entirety by the reference character 25 and a plurality of forward-acting ejectors each generally designated by the reference character F carried by this pivoted carrier, one for each of the eleven columns CC1–CC11 of the rear bank (see FIGS. 2, 7 and 14). There are eleven ejectors F in all and these are specially designated F1–F11 from right to left. Each ejector F is carried by the carrier 25 for movement between a lowered retracted position (see FIG. 2) and a raised ejecting position. The carrier 25 is swingable forward from a rearward retracted position to move forward any ejector F which may be raised to eject the lowermost pack from the respective column of the rear bank C. See FIG. 2 showing carrier 25 in retracted position, and FIG. 7 showing it moved forward through an ejecting stroke.

Figure 5:
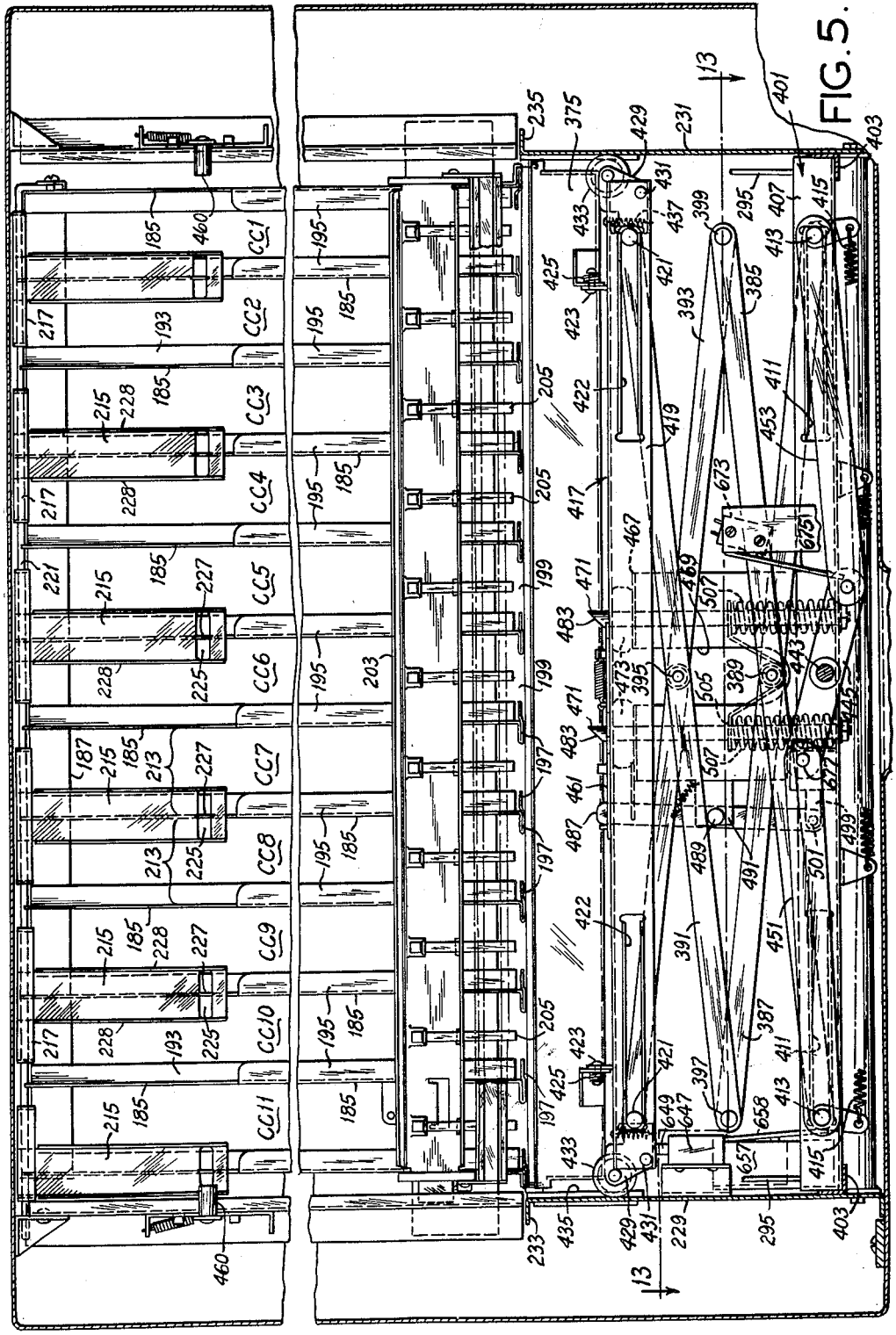
FIG. 5 is a vertical section taken generally on line 5—5 of FIG. 2, showing the front of a third or rear bank of columns in the cabinet, and showing the elevator in lowered position.

An elevator designated in its entirety by the reference numeral 27 extends from side-to-side of the assembly 21, being mounted for movement in the space 18 between a lowered position in assembly 21 as shown in solid lines in FIG. 2 (and as shown in FIG. 5) for receiving a pack ejected rearward from any column in banks A and B or a pack ejected forward from any column in rear bank C and a raised position as shown in dotted lines in FIG. 2 (and as shown in FIG. 15) for delivery of a pack over the top of the first and second banks A and B to the delivery station D. The elevator and its operating mechanism (to be described) are part of the removable base assembly or unit 21, which may therefore be referred to as the ejector-elevator assembly or unit.

The first and second banks of columns A and B are carried by a gate generally designated 29 which is pivoted for swinging movement on a vertical axis toward the front and at the left of the cabinet. This gate comprises a frame 31 with a vertical channel 33 secured to the left side and a vertical channel 35 secured to the right side of the frame. Frame 31 consists of a bar bent to C-shape, with a diagonal bracing strut 37. The left side channel is hinged as indicated at 39 on a vertical gate post 41 secured to the left side wall of the cabinet 1. Extending across the gate are upper and lower horizontal rock shafts 43 and 45 having their ends journalled in holes in the gate side channels 33 and 35. Bank A of columns is located directly in front of the gate and the rock shafts; bank B is located directly rearward of the gate and the rock shafts.

Bank A comprises a series of vertical partitions 47 which define the sides of columns AC1–AC11 and which are held in assembly by upper and lower back straps 49 and 51. Each partition has a flange 53 at its rearward edge, these flanges being secured to the back straps as by spot welding, and a flange 55 at its forward edge. The upper back strap has forwardly extending flanges 57 at its ends and the lower back strap has similar forwardly extending flanges 59 at its ends on the outside of the end partitions of the series of partitions. Each partition is formed at its lower edge to provide laterally spaced ledges 61 at the lower ends of the columns in the first bank A for supporting stacks of packs in the columns. Between the ledges 61 at the sides of the lower end of each column in the first bank A there is a space 63 to accommodate passage of the respective ejector E1–E11 when the ejector is raised and moves rearward to eject a pack. The rear flanges 53 of partitions terminate short of the ledges at the front bank so that there is a full-width rear ejection opening 65 at the bottom of each column in the first bank A. Back strap 51 carries leaf springs 69 which extend down directly behind the ejection openings, backing the rear ends of the lowermost packs of the columns and preventing the lowermost packs from sliding rearward in case the vendor should be tilted backward. These leaf springs flex upward on ejection of packs to permit the packs to slide out rearward. A strap 71 extends across the front of the first bank of columns A, and this strap is notched as indicated at 73 to accommodate ejectors E when raised.

Bank B comprises a series of vertical partitions 75 which define the sides of columns BC1–BC7 and which are held in assembly by upper and lower front straps 77 and 79. Each partition 75 has a flange 81 at its forward edge, these flanges being secured to the front straps 77 and 79 as by spot welding, and a flange 83 at its rearward edge. The upper straps 77 has rearwardly extending flanges 85 at its ends and the lower strap has similar rearwardly extending flanges 87 at its ends on the outside of the end partitions of the series of partitions. Each partition 75 is formed at its lower edge to provide ledges 89 at the lower ends of the columns in bank B for supporting stacks of packs in the columns of bank B. Between the ledges at the sides of the lower end of each column in bank B there is a space 91 to accommodate passage of the respective ejector E when the ejector is raised and moves rearward through an ejecting stroke. The rear flanges 83 of partitions 75 terminates short of the ledges at the bottom of the columns in bank B so that there is a full-width rear ejection opening 93 at the bottom of each column in bank B. Immediately above the ejection openings of the columns of bank B there is a third and relatively narrow back strap 95 extending from the side-to-side of bank B. This carries leaf springs 97 like leaf springs 69 which extend down behind the ejection openings 93, backing the rear ends of the lowermost packs in the columns of bank B and preventing the lowermost packs from sliding rearward in case the vendor should be tilted. Like leaf springs 69, the leaf springs 97 deflect upward on ejection of packs from the columns of bank B to permit the packs to slide out rearward.

A lever 101 is secured centrally of its ends to the upper rock shaft 43 adjacent the right end of this shaft immediately inward of the right side channel 35 of the gate. A similar lever 103 is secured centrally of its ends to the lower rock shaft 45 adjacent the right end of this shaft below lever 101. A link 105 interconnects the rear ends of levers 101 and 103. Rocker arms 107 and 109 extend forward from rock shafts 43 and 45 adjacent their left ends, each of these arms being secured to its respective shaft. Rocker arms 111 and 113 extend rearward from the rock shafts 43 and 45 on the left side of bank B. Adjacent their forward ends, levers 101 and 103 and arms 107 and 109 have notches 115 receiving pins 117 extending laterally from the sides of the first bank A of columns for hanging bank A in vertical position on the levers 101 and 103 and arms 107 and 109 at the front of the gate 29. Adjacent their rearward ends, levers 101 and 103 and arms 111 and 113 have notches 119 receiving pins 120 extending laterally from the sides of the second bank B of columns for hanging bank B in vertical position on the levers 101 and 103 and arms 111 and 113 directly rearward of the gate 29.

It will be observed that rock shafts 43 and 45, levers 101 and 103, and rocker arms 107, 109, 111 and 113 interconnect banks A and B in a four-bar parallelogram type linkage, such that when bank A is down, bank B is up; when bank B is down, bank A is up; when bank A is raised, bank B is lowered; and when bank B is raised, bank A is lowered.

A lever 121 is pivoted at 123 on channel 35 and carries a latch pin 125 engageable with a shoulder 127 on a latch 129 pivoted at 131 on the right side channel 35 of the gate 29 for latching banks A and B in an intermediate elevated position wherein both banks are at the same level for enabling easy swing out of the gate and these banks (see FIG. 8). This latch is biased in the direction for latching interengagement with the pin by a spring 133, and has a lateral ear 135 serving as a handle for releasing it. A latch for latching the assembly of gate 29 and banks A and B in vending position in the cabinet 1 is indicated at 137. This latch comprises a rod vertically slidable in a guide 139 on the outside of the right side channel 35 and having its upper end bent to form a finger 141 which extends inward through a vertical slot 143 in channel 35. Finger 141 is received in a slot 145 in a rocker arm 147 pivoted at 149 on channel 35. Arm 147 extends forward from its pivot 149 and carries a pin 151 at its forward end which is received in a cam slot 153 in a bank shifter link 155. This bank shifter link is pivoted at its upper end on the lower hanger pin 117 for the first bank A of columns, and has a follower roller 157 at its lower end. This follower roller is adapted for reception between upper and lower ears 159 and 161 on the forward end of a forwardly extending arm 163 of a bell crank lever 165 pivoted at 167 on the ejector-elevator assembly 21.

A link 169 is pin-connected at 171, where it has a handle 173, to the forward end of the lever 121. This link extends down from lever 121 and has a pin 175 at its lower end adapted to bear on the upper edge of arm 147, and which also serves as a pin connection for one end of a short link 177 interconnecting the lower end of link 169 and the free end of arm 147. The aforementioned pin 151 serves for the pin connection between the short link and the arm. The lower end of the latch 137 is adapted for downward entry into a hole 179 in the ejector-elevator assembly 21 for latching the assembly of gate and banks A and B in vending position in the cabinet. Channel 35 carries a roller 183 adapted to ride on the top of assembly 21.

To swing banks A and B out of the cabinet (the front door of the cabinet being open), handle 173 is pulled up to raise the first bank A of columns off the ejector-elevator assembly and becomes automatically latched in the aforesaid intermediate position by interengagement of latch 129 with pin 125. Here it is to be mentioned that at the end of each vending cycle, bank A occupies its lowered position. Bank B is lowered to intermediate position, wherein its lower end is still above assembly 21. When handle 171 is pulled up, link 169 swings up the arm 147. This lifts the latch 137 to free the gate-column assembly to be swung out of the cabinet. Also, pin 151 on arm 147 acts on the bank shifter link 155 to swing it forward so as to swing follower roller 157 out of the ears 159, 161. After the gate-column assembly is swung back into the cabinet, latch 129 is released. This permits bank A to drop down to its lowered position, with concomitant raising of bank B, lowering of latch 137, and inward swing of shifter link 155 for re-coupling of follower roller 157 to bell crank lever 165.

Bank C of columns comprises a series of vertical partitions 185 which define the sides of columns CC1–CC11, and which are held in assembly by upper, intermediate and lower back straps 187, 189 and 191. Each partition has a flange 193 at its rearward edge, these flanges being secured to the back straps as by spot welding, and a flange 195 at its forward edge. Each partition is formed at its lower edge to provide laterally spaced ledges 197 at the lower ends of the columns in bank C for supporting stacks of packs in the columns. Between the ledges 197 at the sides of the lower end of each column in bank C there is a space 199 to accommodate passage of the respective ejector F when the ejector is raised and moves forward to eject a pack. The front flanges 195 of partitions terminate short of the ledges 197 at the bottom of the columns in bank C so that there is a full width front ejection opening 201 at the bottom of each column in bank C. Immediately above the ejection openings 201 of the columns of bank C there is a front strap 203 extending from side-to-side of bank C. This carries leaf springs 205 (like leaf springs 69 and 97) which extend down in front of the ejection openings 201, fronting the forward ends of the lowermost packs in the columns of bank C and preventing these packs from sliding forward in case the vendor is tilted forward. These leaf springs 205 deflect upward on ejection of packs to permit the packs to slide out forward.

Figure 3:
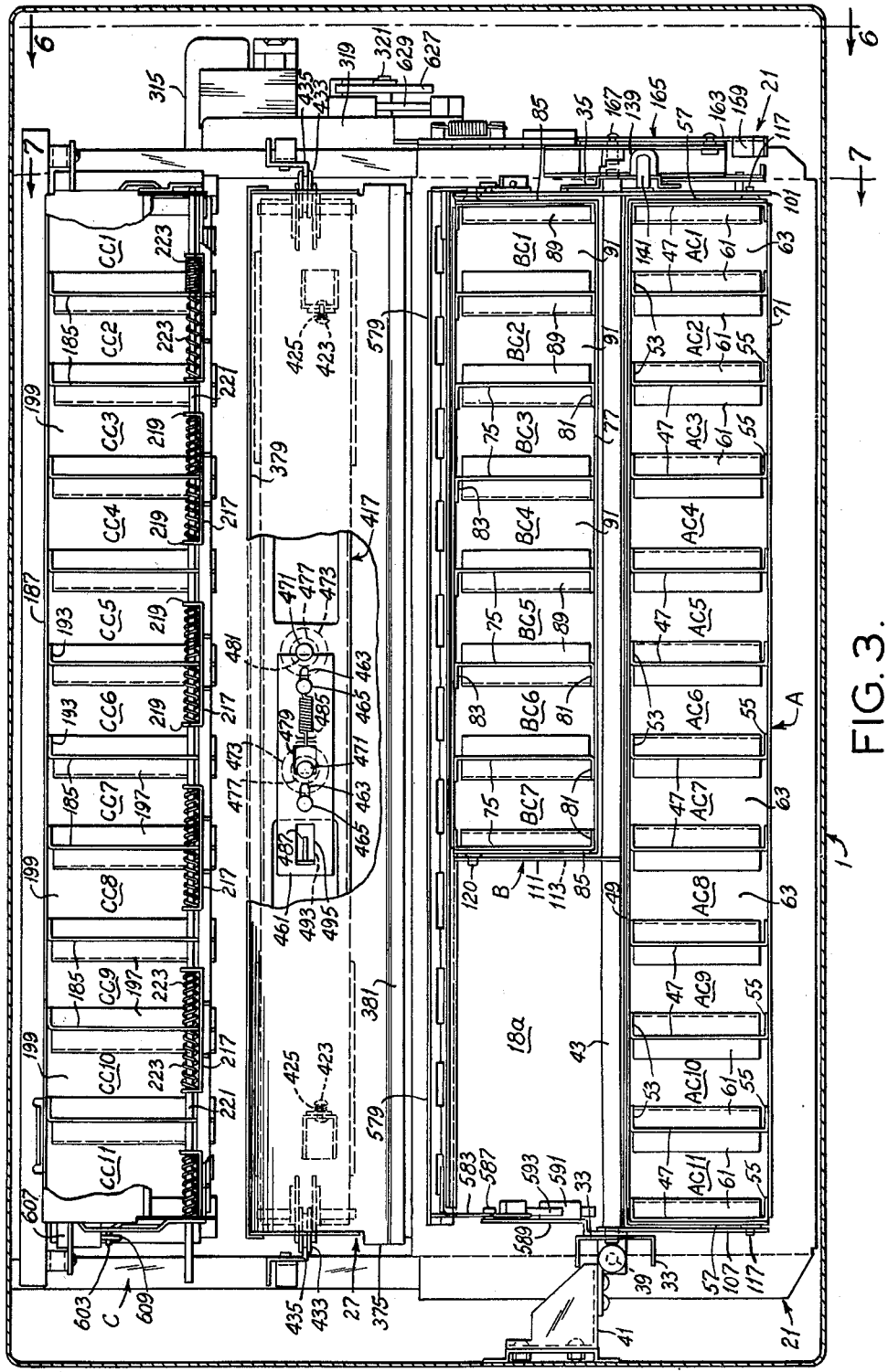
FIG. 3 is a horizontal section taken generally on line 3—3 of FIG. 2, with parts broken away.
Figure 4:
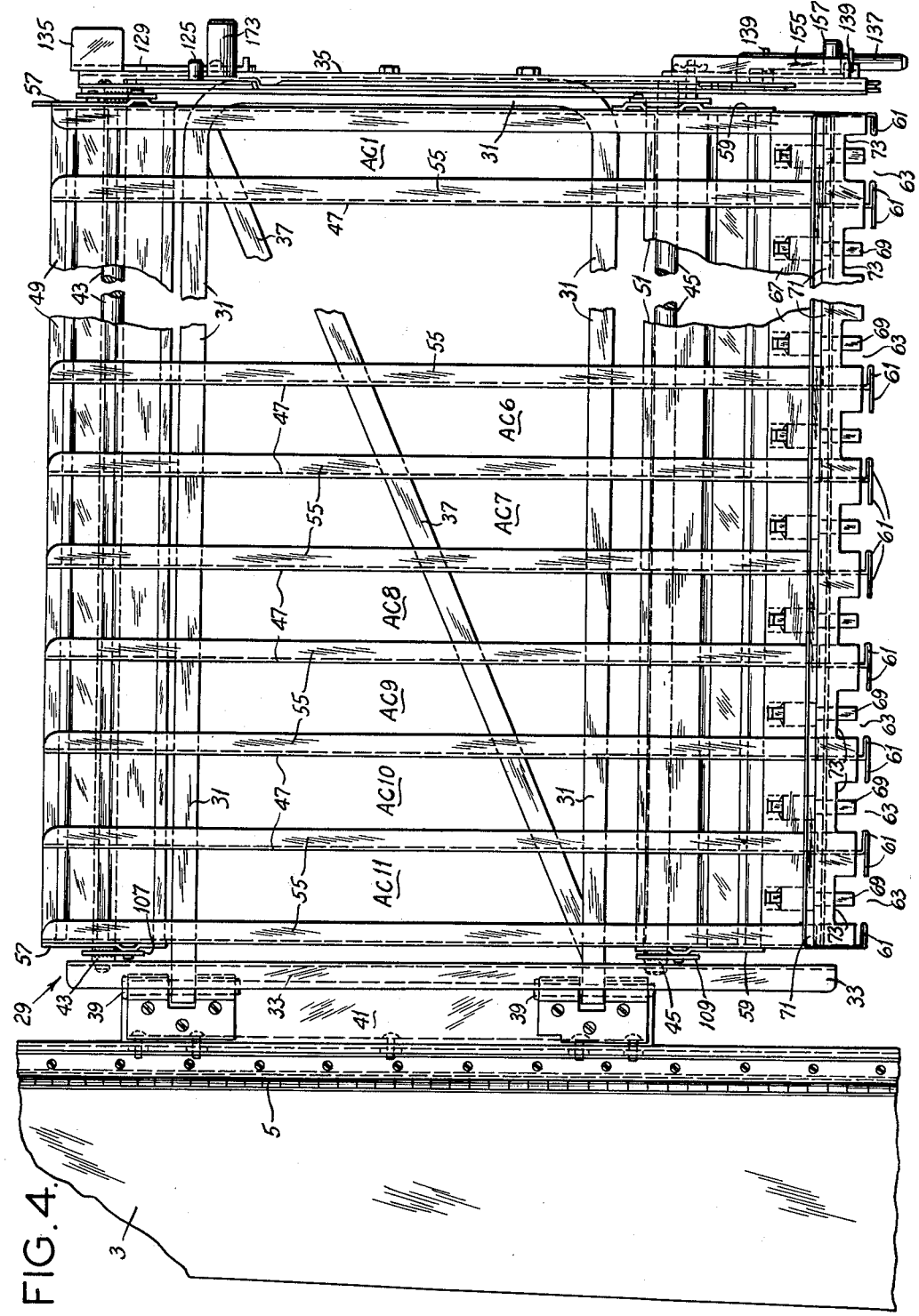
FIG. 4 is a fragmentary front elevation showing the front door of the cabinet open and showing the front of a first bank of columns in the cabinet.

Bank C is fixedly mounted on the back wall of the cabinet. It extends substantially up to the top wall of the cabinet, and to provide for easy front loading of the columns in bank C, the front flanges 195 of partitions 185 terminate short of the upper ends of the partitions to provide full-width loading openings 213 at the front of the columns in bank C at their upper ends. A series of shutters 215 is provided for partially closing the loading openings, these shutters being laterally slidable to open up the openings for loading. Each shutter is generally of T-shape, having a horizontal top portion 217 with rearwardly directed end ears 219 slidable on a rod 221 extending from side-to-side of bank C at the upper front thereof. Each shutter is normally held in a centered position in relation to a respective partition by springs 223, and may be slid to the right or left against the return spring bias to open up a respective loading opening. FIG. 3 shows how the extreme right-hand shutter, for example, is slid to the left for opening up a loading opening. The stem of each T-shaped shutter has a horizontal slot 225 receiving a tang 227 on the front edge of a respective partition 185, the tang preventing pivoting of the shutter on rod 221.

Each shutter or closure 215 has forwardly extending flanges 228 at opposite sides of its stem portion. In loading a column of the rear bank, the serviceman simply has to take a number of packs in his hand, and engage them with a flange 228, pushing the closure to the right or left (as the case may be) to slide the closure laterally to open position. Then he enters the packs in the column through the loading opening 213, and slides the packs down in the column. The closure immediately springs back to its closed position.

The ejector-elevator assembly comprises left and right side walls 229 and 231. These have outwardly extending peripheral flanges including top flanges 233 and 235. At the top of the assembly and toward the front there is a shelf 237 extending from side-to-side of the unit spanning the side walls 229 and 231 secured to the top flanges 233 and 235. This shelf has a series of slots 239 extending in front-to-rear direction, one slot for each of the ejectors E1–E11, there being eleven such slots in all. The carriage 23 which carries the ejectors E comprises left and right hand end members each designated 241 and each carrying rollers 243 riding in an elongate horizontal slot 245 in the respective side wall, and a crossbar 247 spanning the end members. The carriage 23 (constituted by end members 241 and bar 247) is slidable rearward from the forward retracted position in which it appears in FIG. 2 to the rearward position in which it appears in FIG. 7 (which may be referred to as its advanced position). Bar 247 carries the ejectors E with each ejector mounted for up and down vertical sliding movement relative thereto. For this purpose, bar 247 is of channel shape in cross section, having a generally vertical web and rearwardly directed upper and lower flanges 249 and 251, with a downwardly directed lip 253 on the upper flange and an upwardly directed lip 255 on the lower flange. Each ejector is of L-shape, constituted by a sheet metal strip bent to have a rearwardly directed lower foot 257, and is vertically slidable in slots 259 and 261 provided in the upper and lower flanges 249 and 251 adjacent the lips 253 and 255. Each ejector E registers with a respective slot 239 in the shelf, and is vertically slidable relative to bar 247 between a lowered retracted position wherein its upper end is located in the respective slot 239 generally flush with the shelf, and a raised ejecting position wherein it extends up through the respective slot above the shelf. The lowered retracted position of each ejector is determined by engagement of a stud 263 on the ejector with the lip of the lower flange. Extending across the front of the unit 21, spanning the side walls 229 and 231, is a fixed bracket 265 carrying a series of solenoids 267, one for each ejector E. The plunger of each solenoid is designated 269. This plunger acts vertically, and is normally down when the solenoid is deenergized. When any solenoid is energized, its plunger rises and engages the foot 257 of the respective ejector E to raise the ejector.

As will appear, energization of any one of the solenoids 267 may be momentary (by a pulse of current), the solenoid being deenergized immediately following the lift of the respective ejector E and its plunger immediately dropping down. However, when any ejector is raised to its ejecting position, it is latched in this position by the latching engagement of a struck-out tongue 271 on the ejector with an ejector latch rod 273. This latch rod is located in the space between the ejectors and the web of the channel bar 247, extending between the carriage end members 241 and having pivot arms 275 at its ends pivoted as indicated at 277 in ears 278 on the carriage 23. Springs 279 bias the latch rod 273 to swing toward the forward faces of all the ejectors E1–E11. The tongue 271 is formed so that, when any ejector rises, and when the lower end of the tongue clears the latch rod, the latch rod may snap in under the tongue to latch the ejector in its raised ejecting position (see FIG. 9B).

Pivot arms 275 have extensions as indicated at 281 which are engageable with latch trips 283 mounted on the inside of side walls 229 and 231 of assembly 21 as the ejector carriage 23 reaches the end of its rearward ejecting stroke for reverse swinging of the latch rod 273 to release the raised ejector to allow it to drop down to its lowered retracted position. Thus, when the ejector carriage returns to its retracted (forward) position, any ejector E which may have been raised on the ejecting stroke of the carriage is down in its lowered retracted position for the return stroke of the carriage.

When the carriage 23 is in its retracted (forward) position, the ejector latch rod 273 is normally locked in a retracted position clear of the tongues 271 on the ejectors by engagement of the latch rod 273 in notches 285 in a series of rocker arms 287 pivoted as indicated at 289 on bar 247. These rocker arms 287 are interconnected by a trip rod 291 extending between the carriage end members directly rearward of the ejectors E1–E11 and above the studs 263 on the ejectors. When any ejector is lifted, its stud 263 engages the trip rod 291 to swing arms 287 upward, thereby releasing the latch rod 273 to swing in toward the ejectors for latching the ejector in raised position (compare FIGS. 9A and 9B). When carriage 23 moves forward, and the downward extensions 281 of the latch rod, pivot arms 275 engage the latch trips 283 toward the end of the rearward stroke of the carriage, thereby swinging latch rod 273 to its retracted position, arms 287 automatically swing down for engagement of the latch rod 273 in notches 285 (see FIG. 9A) to hold the latch rod 273 in retracted position on the return of the carriage to retracted position.

The pivoted carrier 25 which carries the forward-acting ejectors F for the rear or third bank of columns C comprises left and right hand arms each designated 295 secured to a rock shaft 297 which extends across the assembly 21 adjacent the bottom rear of the assembly, the ends of this shaft being journalled in the side walls 229 and 231. Arms 295 extend upward from the rock shaft 297 and a crossbar 299 extends between the upper ends of these arms. This bar 299 carries the ejectors F1–F11 with each of these ejectors mounted for up and down sliding movement relative thereto. Bar 299 is substantially identical to bar 247 of the ejector carriage 23, ejectors F are substantially identical to ejectors E, and carrier 25 includes a latch rod 273, notched rocker arms 287 and a trip rod 291 the same as carriage 23. Extending across the rear of the assembly 21, spanning the side walls 229 and 231, is a fixed bracket 301 (corresponding to bracket 265 at the front) carrying a series of solenoids 303, one for each ejector F, and acting on ejectors F in substantially the same manner as solenoids 267 act on the ejectors E, except that carrier 25 is somewhat inclined when in its rearward retracted position, and solenoids 303 are correspondingly inclined (see FIG. 2), their plungers 305 acting at the appropriate angle for raising ejectors F when carrier 25 is in retracted position.

A rock shaft 307 extends across the assembly 21 adjacent the bottom front of the assembly, being journalled at its ends in bearings on the side walls 229 and 231. Left and right hand radial arms 309 and 311 are secured on this rock shaft adjacent the insides of side walls 229 and 231, and have pin and slot connections as indicated at 313 to the end members 241 of the sliding carriage 23. The arrangement is such that on clockwise swing of arms 309 and 311, carriage 23 is driven rearward through an ejecting stroke and on counterclockwise swing of these arms, carriage 23 is driven back forward through a return stroke. Pivot arms 275 on the latch rod 273 of the rear ejector carrier 25 have extensions 281 the same as the pivot arms 275 of the front ejector carriage 23. These extensions are engageable with trips 283a (similar to trips 283) to effect release of the latch rod 273 of carrier 25 when the latter reaches the end of its forward ejecting stroke, thereby to release any raised ejector F to allow it to drop down to its lowered retracted position, and to allow the latch rod 273 of carrier 25 to become latched in retracted position by the respective notched rocker arms 287.

Mounted on the outside of the right side wall 231 of unit 21 is an electric motor 315, the shaft 317 of which is coupled to the input of a speed-reducing gear box 319. The output shaft 321 of this gear box extends through a hole in wall 231, and has a disk cam 323 secured on its inner end on the inside of wall 231. A crank arm 325 is fixed to the cam at 327, and a link 329 is pin-connected at 331 at one end to the free end of the crank arm and has a pin and slot connection 333 at its other end with arm 311. A link 335 has a pivotal connection at one end at 327 with the cam 323 and has its other end connected as indicated at 337 to the right-hand arm 295 of the pivoted ejector carrier 25. The arrangement is such that when motor 315 is energized, cam 323 is rotated clockwise as viewed in FIGS. 6 and 7 (counterclockwise as viewed in FIG. 18). As will appear, on each vend cycle, the motor is energized to drive the cam through a single revolution. During the first half of the revolution of the cam, link 329 acts to pull the slidable carriage 23 rearward through a rearward ejecting stroke and link 335 acts to swing the pivoted carrier 25 forward through a forward ejecting stroke. Then, on the completion of the revolution of the cam, link 329 pushes carriage 23 back forward through a return stroke, and link 335 swings carrier 25 back rearward through a return stroke.

Means for effecting operation of bell crank lever 165 for the reverse shifting of banks A and B of columns is shown to comprise a lever 339 pivoted intermediate its ends at 341 on the outside of the right side wall 231 of unit 21. Bell crank lever 165, which is pivoted at 167 on a bracket 343 secured to the top flange of wall 231, has an arm 345 extending downwardly from the pivot. A link 347 interconnects the upper end of lever and the lower end of bell crank arm 345. Below the pivot 341, lever 339 carries a stud 349 which extends laterally inward through a slot 351 in wall 231 and which, on its inner end, carries a cam follower roller 353 adapted for engagement by the periphery of cam 323. Lever 339 is biased to swing counterclockwise as viewed in FIG. 6 by a spring 355, this being in the direction for movement of follower roller 353 into position for engagement by the cam 323. However, lever 339 is adapted to be latched in a retracted position, wherein follower roller 353 is clear of the cam, by engagement of a latch-pin 357 on the lever in a notch 359 in a solenoid-controlled latch 361. This latch 361 is pivoted at 363 on the outside of side wall 231 and is biased to swing upward (counterclockwise as viewed in FIG. 6) against the pin 357 by a spring 365. The solenoid for actuating the latch 361 is indicated at 367, the plunger 369 of the solenoid being connected to the latch as indicated at 371 with the arrangement such that when the solenoid 367 is energized, latch 361 is pulled down to release the lever 339 for counterclockwise swing of lever 339 under the bias of spring 355. On this counterclockwise swing of lever 339, bell crank 165 is rocked clockwise to push up bank A, with accompanying down shift of bank B. Bank B stays down until after the carriage has completed its ejection stroke; then, on the return stroke of the carriage, cam 323, acting on follower roller 353, swings lever 339 back clockwise to swing bell crank 165 back counterclockwise, thereby shifting bank B up and bank A down, also effecting relatching of lever 339 in retracted position by latch 361.

The elevator 27 comprises an elongate relatively narrow tray or cradle 375 having a length slightly less than the distance between side walls 229 and 231 of the unit 21. The cradle has upturned ends 377, a back panel 379, and an angled lip 381 at the front. Means for raising and lowering the cradle is shown to comprise a lazy tongs generally designated 383 (appearing to best advantage in FIGS. 5 and 15). This lazy tongs comprises two lower pairs of crossed bars 385 and 387 pin-connected at their intersection as indicated at 389, and two upper pairs of crossed bars 391 and 393 pin-connected at their intersection as indicated at 395. Bars 391 are pin-connected as indicated at 397 at their lower ends to the upper ends of bars 387; bars 393 are pin-connected as indicated at 399 at their lower ends to the upper ends of bars 385. A channel 401 extends between the side walls 229 and 231 of unit 21 spaced somewhat above the bottom of the unit 21. This channel is mounted at its ends on ledges 403 which project inward from bracket plates 405 secured on the inside of side walls 229 and 231 of unit 21, with the flanges 407 of the channel extending upward. Bracket plates 405 are tied together by a torsion bar 409. Flanges 407 of the channel 401 have elongate horizontal slots 411. Bars 385 and 387 of the lazy tongs have pins 413 at their lower ends which are slidable in these slots. Springs 415 connected to these pins bias them toward one another thereby to tend to extend the lazy tongs upward.

At the upper end of the lazy tongs is a horizontal channel 417 arranged with its flanges 419 extending downward. Bars 391 and 393 of the lazy tongs reach into this channel 417 and have pins 421 at their upper ends slidable in elongate horizontal slots 422 in the flanges 419 of the channel. The cradle 375 is pivoted on channel 417 as indicated at 423 for rocking movement on a horizontal axis extending lengthwise of the cradle and the channel. Torsion springs 425 incorporated in the pivots bias the cradle to rock clockwise as viewed from the right side of the unit 21 toward the pack-receiving inclination of the cradle shown in solid lines in FIG. 2 determined by engagement of the bottom of the cradle with pins 427 on channel 417. The cradle is adapted to rock counterclockwise on the axis of pivots 423 against the bias of springs 425 for dumping of a pack out of the front of the cradle over the lip 381. Channel 417 has roller brackets 429 pivoted at 431 thereon adjacent its ends carrying grooved rollers 433 which ride on vertical rails 435 at the sides of the cabinet 1. Springs 437 bias the rollers toward engagement with the rails.

The lazy tongs 383 is adapted to be contracted to pull down the cradle 375 to its lowered, retracted pack-receiving position shown in FIG. 5 and in solid lines in FIG. 2 by spreading apart of the pins 413 to the outer ends of the slots 411, against the lazy tongs extending bias of springs 415. Means for accomplishing this is shown to comprise an electric motor-speed reducing gear box unit 439 mounted on a platform 441 spanning the side walls 229 and 231 of unit 21 in front of channel 401. The shaft of the motor is connected to the input of the gear box and the output shaft 443 of the gear box extends rearward toward the channel 401. A lever 445 is secured intermediate its ends on the rear end of shaft 443. A stud 447 is secured to and extends rearward from the left end of lever 445 as viewed in FIG. 13. A crank arm 449 has one end rigidly secured to the rear end of this stud and extends back across the axis of shaft 443 spaced rearward of lever 445 and parallel thereto. A link 451 interconnects stud 447 and the left-hand pin 413; a link 453 interconnects the free end of crank arm 449 and the right-hand pin 413. The arrangement is such that when the motor of unit 439 is energized, lever 445 and crank arm 449 rotate in unison clockwise as viewed from the front (and as viewed in FIG. 5). As will appear, on each vend cycle, the motor is energized to drive lever 445 and crank arm 449 through a single revolution, starting and ending with the lever 445 and the crank arm 449 in the tongs-contracted position of FIG. 5 wherein pins 413 are at the outer ends of slots 411. As the lever 445 and crank arm 449 rotate through the first half of the revolution, links 451 and 453 pull pins 413 toward one another to extend the lazy tongs 383 upward (see FIG. 15) thereby to raise the cradle 375. As the cradle reaches its fully raised position, its lip 381 engages rollers indicated at 460 for rocking the cradle to deliver a pack from the cradle to the inclined rear end 11a of the pan 11, down which the pack slides to the delivery station D. During the second half of the revolution, links push pins 413 back outward to contract the lazy tongs downward thereby to lower the cradle 375.

Means is provided for latching the lazy tongs 383 in its fully contracted position against the tongs-extending bias of springs 415 to hold cradle 375 down in its lowered, pack-receiving position of FIGS. 2 and 5. This means (which may be referred to as the elevator latching means) comprises a latch plate 461 mounted for sliding movement lengthwise of channel 417 on top of this channel, the latch plate having elongate slots 463 receiving pins 465 extending upward from the channel for this purpose. A sheet metal member 467 generally of inverted U-shape in cross section is secured to channel 401 at the center of this channel. Member 467 has a slot 469 extending down from its top. Two posts each designated 471 extend upward from channel 401 between the sides of member 467 on opposite sides of the slot 469, and reach up above the top of member 467 through holes therein.

On each post above the top of member 467 is a rubber ring 473. Rings 473 seat down on the top of member 467 and constitute bumpers engageable by channel 417 when the lazy tongs 383 is contracted to cushion the impact of channel 417. Slot 469 is provided to receive the pins 389 and 395 when the lazy tongs is contracted.

Each post has a notch 475 facing toward the left adjacent its upper end above the respective bumper 473. Channel 417 has holes 477 in line with the posts. Latch plate 461 has a slot 479 registering with the left-hand hole 477 in the channel 417 and a recess 481 at its right end. When the lazy tongs 383 is contracted, channel 417 is pulled downward into engagement with the bumpers 473 (which determines the lowered, pack-receiving position of cradle 375). The upper ends of the posts are received in the holes 477 in channel 417. The upper end of each post is bevelled as indicated at 483 for camming the latch plate 461 toward the left against the bias of a latch spring 485 as the channel 417 approaches the bumpers, and when the channel 417 finally seats on the bumpers, spring 485 pulls the latch plate to the right for engagement of the portion of the latch plate at the left end of slot 479 in the notch 475 of the left-hand post and for engagement of the portion of the latch plate bounding recess 481 in the notch 475 of the right-hand post. This latches down the lazy tongs in its fully contracted position, with cradle 375 in its lowered pack-receiving position, against the tongs-extending bias of springs 415.

A solenoid-operated latch release lever 487 is provided for sliding latch plate 461 toward the left against the bias of spring 485 to release the lazy tongs for upward extension thereof to raise the cradle 375. This lever is pivoted at 489 intermediate its ends on a bracket 491 mounted on member 467. Channel 417 has a slot 493 and latch plate 461 has a slot 495 registering with slot 493 for receiving the upper end of lever 487 when the channel 417 moves down into engagement with bumpers 473. The solenoid for operating the lever 487 is indicated at 497, its plunger 499 being connected to the lower end of lever 487 as indicated at 501 for swinging lever 487 counterclockwise on energization of the solenoid to slide latch plate 461 to the left. A return spring for lever 487 is indicated at 503.

A strap 505 is vertically slidable on the posts 471 and biased upward by coil compression springs 507 surrounding the posts. This strap has a V-shaped portion 509 at the slot 469 in member 467. When the lazy tongs is contracted, pin 389 of the lazy tongs engages in the V-shaped portion 509 of the strap and moves the strap downward to compress springs 507. When the latch plate 461 is released to release the lazy tongs for upward extension, springs 507 drive the pin 389 upward rapidly to start the extension of the lazy tongs.

As previously noted, bank A of columns is down and bank B is up at the start of any vend cycle. Also, downshift of bank B to its lowered position for ejection of the lowermost pack in any one of columns BC1–BC7 (and accompanying up-shift of bank A) is controlled by solenoid 367, occurring only when this solenoid is energized. Means is provided for controlling solenoid 367 so that it is energized to effect down-shift of bank B (and accompanying up-shift of bank A) only under circumstances where the purchaser operates one of selector switches S1–S7 to buy a brand of cigarettes stocked in one of the seven paired sets of columns AC1–BC1, AC2–BC2, etc. and the previous ejection of a pack of that brand has occurred from the respective column of bank A. For example, assume that a purchaser operates switch S1 to buy a pack of the brand stocked in paired columns AC1–BC1. Also assume that on the immediately previous purchase of this brand, a pack was ejected from column AC1. Operation of switch S1 will now effect energization of solenoid 367, as will be made clear, to effect down-shift of bank B so that the pack of the desired brand will be ejected from column BC1. The next time switch S1 is operated, no down-shift of bank B will occur, and a pack of the respective brand will be ejected from column AC1. Then, the next time switch S1 is operated, down-shift of bank B will occur, and a pack of respective brand will be ejected from column BC1, and so on. It will also be noted that no down-shift of bank B occurs on operation of a selector switch for buying a pack from any of columns AC8–AC11 or CC1–CC11.

Figure 20:
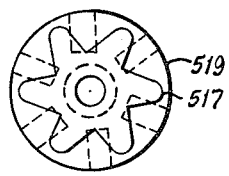
FIG. 20 is a plan of a rotary switch actuator, a number of which are used in the vendor.
Figure 21:
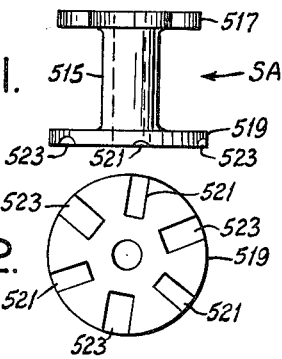
FIGS. 21 and 22 are views in elevation and bottom plan, respectively, of the FIG. 20 actuator.
Figure 22:
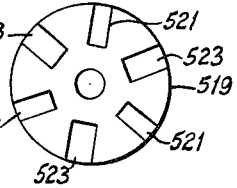
Figure 23A:
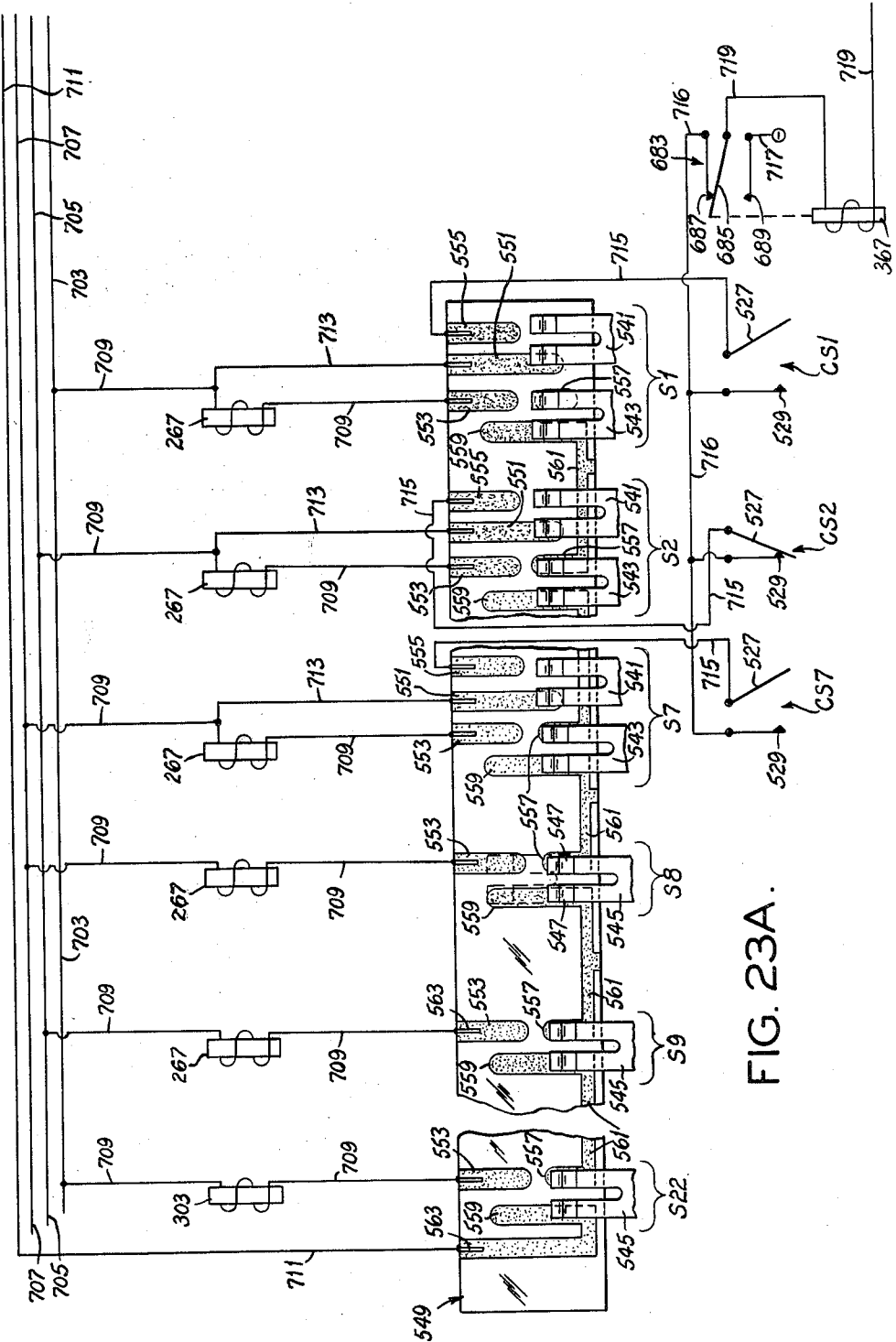
FIG. 23A is a wiring diagram showing a portion of the electrical circuitry of the vendor.

The means for controlling solenoid 267 as above noted comprises a series of seven switches CS1–CS7 (which may be referred to as alternating switches) and a series of seven rotary switch actuators SA1–SA7, one for each of the seven switches. Switch CS1 and its actuator SA1 are associated with the first pair of columns AC1–BC1, switch CS2 and its actuator SA2 are associated with the second pair of columns AC2–BC2, etc. Switches CS1–CS7 are mounted on the side leg of an angle bar 511 carried by brackets 513 secured to bracket 265. Each of the switch actuators SA1–SA7 resembles a spool (see particularly FIGS. 20–22) having a tubular barrel 515 and upper and lower end heads 517 and 519. Each spool-shaped actuator SA1–SA7 is rotary on a respective stud 521 extending upward from the upper leg of angle bar 511. The upper end head 517 of each actuator is formed as a ratchet, and will be hereinafter so designated. As shown, each ratchet 517 has six teeth. The lower end head 519 of each actuator has three radially extending shallow grooves 521 alternating with three relatively deep grooves 523 in its bottom. Each switch CS1–CS7 has a button-end operating arm 525 which is biased upward against the bottom of the lower end head 519 of the respective actuator or alternator SA1–SA7. Each alternator switch CS1–CS7 is shown in FIG. 23A as a single-throw switch having a blade 527 engageable with a fixed contact 529. As any alternator SA is indexed through 60° steps (as will appear), grooves 521 and 523 thereof alternately come into register with the button on the end of the operating arm 525 of the respective alternator switch. When a deep groove 523 registers with the button, blade 527 is open off contact 529. When a shallow groove 521 registers with the button, blade 527 is closed on contact 529. Thus, on successive 60° indexing steps of each alternator SA, the blade of the respective alternator switch CS alternates between open and closed positions. The grooves function as detent grooves in conjunction with the button on the operating arm to latch the alternator SA at each of its 60° indexing intervals.

Each of the ejectors E1–E7 for the seven paired columns AC1–BC1 carries on the foot 257 thereof a pawl 533 for engagement with the ratchet of the respective alternator SA1–SA7 for rotating the latter. When any one of ejectors E1–E7 is raised, the respective pawl 533 is raised along with it to a position for engagement with the ratchet 517 of the respective alternator SA1–SA7 (see FIG. 19). Then, when carriage 23 moves rearward, carrying the raised ejector with it, the pawl 533 carried by the raised ejector indexes the respective alternator through an angle of 60°. As previously noted, the raised ejector is dropped down at the rear end of the rearward stroke of the carriage 23, and, when the carriage returns forward to its retracted position, the pawl passes under the ratchet.

Each selector switch S1–S7 comprises a lever 535 pivoted intermediate its ends as indicated at 537 in FIG. 2 for swinging movement on a horizontal axis. The levers 535 extend forward through an opening in the door, and each lever has a flat button 539 on its forward end, the array of buttons resembling a keyboard. Each lever is biased by a spring 540 to swing clockwise as viewed in FIG. 2 to a retracted position wherein its forward end is raised and its rearward end is lowered. The lever of each of the seven selector switches S1–S7 (related to the seven pairs of columns AC1–BC1, AC2–BC2, etc.) carries a pair of upwardly extending electrically conductive forked blades 541 and 543 at its rearward end, and the lever of each of the remaining selector switches S8–S22 carries a single upwardly extending forked blade 545 at its rearward end (see FIGS. 2 and 23A). Each tine of each of the forked blades has a nose 547 engaging a relatively narrow printed circuit board 549 under the inherent bias of the blade. Each blade normally occupies a lowered position, and when the respective button 539 is pushed down, the blade moves up and wipes over the circuit board.

With regard to each of selector switches S1–S7, the circuit board is printed with a relatively long contact 551 extending down from its upper edge and two relatively short contacts 553 and 555 extending down on opposite sides of contact 551. A short contact 557 extends upward from near the lower edge of the board in line with contact 553, terminating short of the latter so that there is a gap therebetween. A long contact 559 extends upward from near the lower edge of the board on the side of contacts 553, 557 opposite contact 551. The contacts 559 and 557 of successive switches S1–S7 are interconnected as indicated at 561. Blade 541 of each switch S1–S7, when down, has its left-hand nose engaging contact 551 and its right-hand nose below the lower end of contact 555. Blade 543 of each switch S1–S7, when down, has its left-hand nose engaging contact 559 and its right-hand nose engaging contact 557. When the blades 541 and 543 of any switch S1–S7 move upward on pushing down the respective button 539, blade 541 interconnects contacts 551 and 555, and blade 543 interconnects contacts 559 and 553. With regard to each of selector switches S8–S22, the circuit board is printed with a relatively short contact 553 extending down from its upper edge, a relatively short contact 557 extending upward from near the lower edge of the board and terminating short of contact 553 so that there is a gap therebetween, and a relatively long contact 559 extending upward from near the lower edge of the board alongside contacts 553 and 557. Contact 559 of switch S7 is interconnected with contact 557 of switch S8 and contacts 559 and 557 of successive switches S8–S22 are interconnected as indicated at 561. Blade 545 of each switch S8–S22, when down, interconnects contacts 559 and 557 and, when up, interconnects contacts 559 and 553. Terminals for attachment of conductors to contacts 551, 553 and 555 are clipped into notches as indicated at 563.

The ejector-elevator assembly 21, at its left end, carries a switch 565 which is controlled by the latch rod 273 for the front ejectors E and a switch 567 which is controlled by the corresponding latch rod 273 for the rear ejectors F. Each of these switches is a double-throw switch, having a blade 569 normally closed on a fixed contact 571 and movable off contact 571 on to a fixed contact 573 (see FIG. 23B). Switch 565 has an operating arm 575 engageable by the pivot arm extension 281 at the left end of the latch rod 273 for ejectors E when this rod swings to latch up an ejector E to throw its blade from contact 571 to contact 573. Switch 567 has a similar arm 577 engageable by the pivot arm extension 281 at the left end of the latch rod 273 for ejectors F when this rod swings to latch up an ejector F to throw its blade from contact 571 to its contact 573.

Means is provided for detecting the emptying of any of the seven pairs of columns AC1–BC1, AC2–BC2 etc.

and the four single columns AC8–AC11, and for detecting the emptying of any column CC1–CC11 of the third bank C of columns. As to banks A and B of columns, this detector comprises a flap 579 which extends across the rear of bank B at the lower end thereof. This flap has a rocker arm 581 at its right end and a rocker arm 583 at its left end. Arm 581 is pivoted at 585 on the outside of the right end of bank B. Arm 583 is pivoted at 587 on a bracket 589 (see FIG. 3). This bracket carries an empty switch 591 having an operating arm 593 engageable by arm 583 when the flap is down. When the flap swings upward, arm 593 is released to throw the switch. The flap is gravity-biased to swing down to a lowered position below the level of the bottom of bank B and immediately at the rear of bank B in position for engagement by a pack of cigarettes being pushed rearward by any ejector E. This lowered position of the flap is determined by engagement of an ear 595 on arm 581 with a stop screw 597. When a pack being pushed rearward by any raised ejector E engages the flap, the flap is swung upward to throw the switch 591, and the pack then passes under the flap into the cradle 375. If, however, any one of the seven pairs of columns AC1–BC1, AC2–BC2 etc. or any one of the four single columns AC8–AC11 has been emptied, and a purchaser deposits coin and operates the selector switch S for that pair of columns or single columns, the respective ejector E will sweep through rearward without any pack to push rearward, and flap 579 will simply remain in its down position to abort operation of the switch 591.

As to bank C of columns, the empty detector similarly comprises a flap 599 which extends across the front of bank C adjacent the bottom thereof in front of discharge openings 201. This flap has a rocker arm 601 at its right end and a rocker arm 603 at its left end. These arms are pivoted as indicated at 605 on the outside of the right and left sides of bank C. At the left side of bank C is an empty switch 607 having an operating arm 609 engageable by the left rocker arm 603 when the flap 599 is down. When flap 599 swings upward arm 609 is released to throw the switch. The flap 599 is gravity-biased to swing down to a lowered position in front of openings 201 where it is engageable by a pack being pushed forward by any ejector F. When the pack engages the flap 599, this flap is swung upward to throw the switch 607 and the pack then passes under the flap and drops into the cradle 375. If, however, any one of the columns CC1–CC11 has been emptied, and a purchaser deposits coin and operates the selector switch for that column, the respective ejector F will sweep through forward without any pack to push forward, and flap 599 will simply remain in its down position to abort operation of the switch 607. Each of empty switches 591 and 607 is shown in FIG. 23B as a single-throw switch, each having a blade 611 normally engaging a contact 613 and movable off contact 613 when the respective flap 579 or 599 is swung upward by a pack being ejected.

Figure 23B:
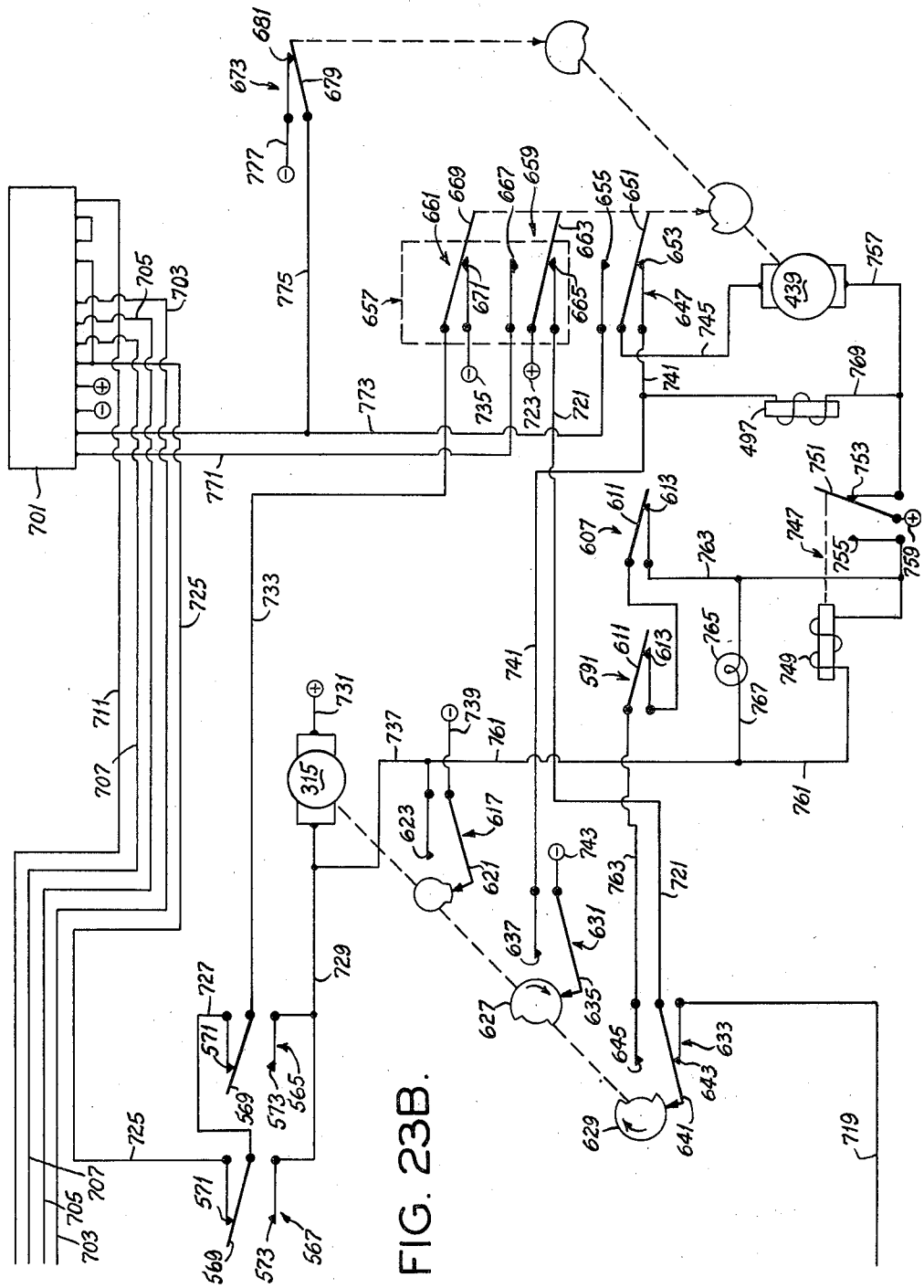
FIG. 23B is a wiring diagram in continuation of FIG. 23A showing the remainder of the circuitry.

A holding switch for the motor 315 is indicated at 617 (see FIGS. 7 and 23B). This is located at the left of the assembly 21 and has an operating arm 619 engageable by the left end of carriage 23 when the latter is retracted. As shown in FIG. 23B, switch 617 is a single-throw switch having a blade 621 which is open off a fixed contact 623 when arm 619 is pressed by carriage 23. When the carriage 23 moves rearward, blade 621 closes on contact 623.

The drive shaft 321 for the ejectors carries two cams 627 and 629 operable, respectively, on two switches 631 and 633. Cam 627 and its respective switch 631 control the operation of the elevator solenoid 497 and the elevator drive motor 439, acting to energize this solenoid and this motor to start the upward movement of the elevator provided the purchaser has not actuated a selector switch S for an empty column or pair of columns. However, the starting of the elevator is also under control of cam 629 and switch 633, the latter acting to abort operation of the elevator if the purchaser should actuate a selector switch S for an empty column or pair of columns, as will appear. As appears in FIG. 23B, switch 631 is a single-throw switch, having a blade 635 engageable with a fixed contact 637. Cam 627 comprises a notched disk, and rotates through a single revolution on each vend cycle. In its 0° position, cam 627 holds blade 635 off contact 637, and continues to hold blade 635 off contact 637 for approximately 210° of revolution of the cam. Then, the button of switch 631 snaps out into the notch of cam 627 to throw blade 635 on to contact 637, where it remains for about 60° of revolution of the cam. Then, blade 635 is thrown back off contact 637 for the remainder of the revolution of the cam. Switch 633 is a double-throw switch, having a blade 641 engageable with either of two fixed contacts 643, 645. Cam 629 also comprises a notched disk, and rotates with cam 627 through a single revolution on each vend cycle. In its 0° position, it holds blade 641 on contact 643. At about 40° of revolution of cam 629, the button of switch 633 snaps into the notch in the cam to throw blade 641 on to contact 645, where it remains for about 90° of revolution of the cam. Then, blade 641 is thrown back on contact 643 for the remainder of the revolution of the cam.

In FIG. 23B, the holding switch 617 is represented as being controlled by a cam (as it could be) instead of being controlled by carriage 23 (the effect is the same). Functionally, blade 621 of switch 617 is thrown on to contact 623 shortly after the motor 315 starts to establish a holding circuit for motor 315, then is thrown back off contact 623 to break the motor holding circuit and effect a single revolution of shaft 321. The timing of cam 629 is related to operation of the empty switches 591 and 607 by flaps 579 and 599, such that blade 641 of switch 633 is thrown on to contact 645 slightly after operation of one or the other of the empty switches, and thrown back on to contact 643 slightly before either empty switch resets. The timing of cam 627 is related to operation of the ejectors such that blade 635 of switch 631 is now thrown on to contact 637 before a pack is pushed into the cradle 375.

A holding switch for the elevator drive motor unit 439 is indicated at 647 (see FIGS. 5, 13 and 23B). This is located at the left of assembly 21 and has an operating arm 649 engageable by the left end of the cradle-carrying channel 417 of the lazy tongs when the latter is contracted. As shown in FIG. 23B, switch 647 is a double-throw switch having a blade 651 closed on a fixed contact 653 when arm 649 is pressed down by channel 417 (see FIG. 5). When the lazy tongs is extended and channel 417 rises, arm 649 is released and blade 651 is thrown on to a fixed contact 655. As will appear, this establishes a holding circuit for the elevator drive motor unit 439.

A dual switch 657 is also mounted at the left of assembly 21, this switch having an operating arm 658 engageable by the left-hand pin 413 of the lazy tongs when the latter is contracted and this pin slides out to the left end of its respective slot 411. As shown in FIG. 23B, dual switch 657 comprises a double-throw switch 659, which may be referred to as a coin-handling switch, and a single-throw switch 661, which may be referred to as a cycle safety switch. The coin-handling switch 659 has a blade 663 closed on a fixed contact 665 when the arm 658 is pressed by the stated pin 413. When the lazy tongs is extended, arm 658 is released and blade 663 is thrown on to a fixed contact 667. The cycle safety switch 659 has a blade 669 closed on a fixed contact 671 when arm 658 is pressed by the stated pin 413, this blade opening off contact 671 when arm 658 is released upon extension of the lazy tongs.

A switch 673, which may be referred to as a safety switch, is mounted in assembly 21 at the right of lever 445, and has an operating arm 675 engageable by a stud 677 at the left end of lever 445 as viewed in FIGS. 5 and 13. This safety switch is a single-throw switch having a blade 679 normally closed on a fixed contact 681. Upon 180° clockwise rotation of lever 445 from its 0° position of FIG. 5, stud 677 presses arm 675 and then wipes on by as lever 445 completes a revolution. This effects a momentary opening of safety switch 673 as the elevator reaches its fully raised position.

A switch 683, which may be referred to as the shift holding switch, is mounted on the right side wall 231 of assembly 21. This switch has an operating arm engageable by an ear on latch 361 (see FIG. 6). As shown in FIG. 23A, switch 683 is a double-throw switch, having a blade 685 which is closed on a fixed contact 687 when solenoid 367 is deenergized and latch 361 is up, and which is thrown on to a fixed contact 689 when the latch is pulled down by the solenoid 367.

Now referring to the wiring diagram constituted by FIGS. 23A and 23B, there is indicated at 701 the coin-handling apparatus of the vendor. As herein shown, this is a multi-price type of coin-handling apparatus including means whereby a circuit is completed to a so-called high price line 703 on deposit of coin in the amount of a high price (40¢, for example), whereby a circuit is completed to a so-called medium price line 705 on deposit of coin in the amount of the medium price (35¢, for example), and whereby a circuit is completed to a so-called low price line 707 on deposit of coin in the amount of the low price (30¢, for example). Such apparatus is well known in the art.

Each of the twenty-two ejector-operating solenoids 267 and 303 is connected in a line 709 between one of the price lines 703, 705, 707 and contact 553 of the respective selector switch S1–S22. To simplify the wiring diagram, only selector switches S1, S2, S7, S8, S9 and S22 and the related solenoids 267 and 303 are shown. Columns AC1 and BC1, governed by switch S1, may be stocked with a high price brand; consequently solenoid 267 governed by switch S1 is shown as connected to the high price line 703. Columns AC2 and BC2, governed by switch S2, may be stocked with a medium price brand; consequently solenoid 267 governed by switch S2 is shown as connected to the medium price line 705. Columns AC7 and BC7, governed by switch S7, may be stocked with a low price brand; consequently solenoid 267 governed by switch S7 is shown as connected to the low price line 707. The solenoids 267 governed by switches S8, S9 are shown as connected to lines 707 and 705, respectively, and the solenoid 303 governed by switch S22 is shown as connected to line 703, simply by way of illustration.

A return line 711 extends from the contact 559 of the last selector switch S22 back to the coin-handling apparatus 701. The arrangement is such that when a purchaser deposits coin in slot 9 of the vendor in appropriate amount, and operates a selector switch, the respective solenoid 267 or 303 is energized via the respective line 709 and line 711. For example, assuming that a purchaser deposits coin in the amount of the high price (thereby energizing the high price line 703), and operates selector switch S1, a circuit is completed from line 703 through the respective line 709, through blade 543 of switch S1 (which is raised) from contact 553 to contact 559 of switch S1, thence via connection 561 between contact 559 of switch S1 to contact 557 of switch S2, thence via blade 543 of switch S2 (which is down) to contact 559 of switch S2, and so on throughout the length of the circuit board 549 to the contact 559 of the last selector switch S22, and thence via line 711 back to the coin-handling apparatus. If any other selector switch should be actuated, the stated circuit is broken. For example, if switch S2 should be actuated, blade 543 of switch S2 will rise off contact 557 of switch S2 to break the stated circuit. Thus, the circuit board arrangement provides an electrical interlock to prevent energization of more than one of the solenoids 267, 303.

As to each of selector switches S1–S7, which control dispensing from the paired columns AC1–BC1 to AC7–BC7, a line 713 is connected in parallel with the respective solenoid 267 to the respective contact 551 on the circuit board, and a line 715 interconnects the respective circuit board contact 555 and the blade 527 of the respective alternator switch CS1–CS7. Thus, when any one of switches S1–S7 is actuated, a circuit is completed from the respective line 713 via the respective contact 551, the respective blade 541 (which is raised), the respective contact 555 and the respective line 715 to the respective blade 527. Thus, for example, when selector switch S1 is actuated, a circuit is completed to blade 527 of switch CS1 (which may be open or closed).

A line 716 interconnects contacts 529 of all the alternator switches CS1–CS7 to contact 687 of the shift holding switch 683. Contact 689 of this switch is connected to the negative or ground side of the power source as indicated at 717. Shift solenoid 367 is connected in a line 719 between blade 685 of switch 683 and contact 643 of the cam-controlled switch 633. Blade 641 of switch 633 is interconnected with contact 665 of switch 659 by a line 721, and blade 663 of switch 659 is connected to the positive side of the power source as indicated at 723.

A starting circuit for the ejector drive motor 315 is shown to include a line 725 interconnecting the coin-handling apparatus 701 and contact 571 of switch 567. Blade 569 of switch 567 and contact 571 of switch 565 are interconnected by a line 727. Contacts 573 of switches 567 and 565 are connected by a line 729 to one terminal of motor 315. The other terminal of the motor is connected to the positive side of the power source as indicated at 731. Blade 569 of switch 565 is connected by a line 733 to blade 669 of switch 661. Contact 671 of switch 661 is connected to the negative side of the power source as indicated at 735. As will be recalled, blade 569 of switch 565 is thrown on to contact 573 of switch 565 when any of ejectors E1–E11 is raised by actuation of the respective selector switch S1–S11 and the respective solenoid 267, and blade 569 of switch 567 is thrown on to contact 573 of switch 567 when any of ejectors F1–F11 is raised by actuation of the respective selector switch S12–S22 and the respective solenoid 303. The circuitry is such that when blade 569 of switch 565 is thrown on to contact 573 of switch 565, a starting circuit for motor 315 is completed from 731 through the motor via line 729, contact 573 and blade 569 of switch 565, line 733 and switch 661 to 735. When blade 569 of switch 567 is thrown on to contact 573 of switch 567, a starting circuit for motor 315 is completed from 731 through the motor via line 729, contact 573 and blade 569 of switch 567, line 727, contact 571 and blade 569 of switch 565, line 733 and switch 661 to 735. Line 725 connects the switches 565 and 567 back to the coin-handling apparatus 701, which includes an interconnection with line 711, such that when blade 569 of either of switches 565 or 567 is thrown off the respective contact 571, power to the selector switches S1–S22 is cut off.

When motor 315 starts, carriage 23 moves rearward and carrier 25 moves forward so that blade 569 of whichever switch 565 or 567 has been actuated is thrown back on to the respective contact 569, thus breaking the starting circuit for motor 315. Before this occurs, however, a holding circuit for motor 315 is completed. This holding circuit comprises a line 737 interconnecting line 729 and terminal 623 of the holding switch 617, with blade 621 of this switch connected to the negative side of the power source as indicated at 739. When blade 621 closes on contact 623, a holding circuit is completed through the motor 315 from 731 via line 729, 737 and switch 617 to 739. This holds the motor in operation for a single revolution of drive shaft 321.

A starting circuit for the motor of unit 439 for driving the elevator is shown to include a line 741 interconnecting contact 637 of cam-controlled switch 631 and contact 653 of switch 647. Blade 635 of switch 631 is connected to the negative side of the power source as indicated at 743. Blade 651 of switch 647 is connected by a line 745 to one terminal of the motor of unit 439. A relay indicated generally at 747 has a coil 749 controlling blade 751 of a double-throw switch, the fixed contacts of which are designated 753 and 755. Coil 749, when energized, throws the blade from contact 753 to contact 755. A line 757 interconnects the other terminal of the motor of unit 439 and contact 753. Blade 751 is connected to the positive side of the power source as indicated at 759. Coil 749 is connected in a line 761 interconnecting contact 755 and line 737.

Empty switches 591 and 607 are connected in series in a line 763 interconnecting contact 645 of switch 633 and line 761. An empty signal lamp 765 is connected in parallel with coil 759 as indicated at 767. The elevator release solenoid 497 is connected in parallel with the motor of unit 439 as indicated at 769. A line 771 interconnects the coin-handling apparatus 701 and contact 667 of switch 659. A line 773 interconnects the coin-handling apparatus 701 and contact 655 of switch 647. A line 775 interconnects line 773 and blade 679 of switch 673, and contact 681 of this switch is connected to the negative side of the power source as indicated at 777.

Switches 647, 659, 661 and 673 are represented in FIG. 23B as if they were controlled by cams driven by the motor of unit 439 (as they could be) instead of being controlled by the elevator mechanism as shown in FIG. 5. Functionally, the effect is the same.

Operation is as follows:

For purposes of describing the operation of the vendor, it will first be assumed that a purchaser deposits coin in the amount of the high price and actuates selector switch S1 to obtain a pack of cigarettes of the brand stocked in paired columns AC1–BC1. It will also be assumed that there are packs in these columns, and that on the previous purchase of a pack of this brand, alternator switch CS1 was opened. On deposit of coin in the amount of the high price, the high price line 703 is energized from the coin-handling apparatus 701. On actuation of selector switch S1 by the purchaser, its blade 543 moves up to bridge its contacts 559 and 553, and its blade 541 moves up to bridge its contacts 551 and 555. Blade 543 of switch S1 completes the circuit for the respective solenoid 267, and the plunger 269 of this solenoid is driven upward to raise the ejector E1 associated with the paired columns AC1–BC1. With alternator switch CS1 open, bridging of contacts 551 and 555 of switch S1 by its blade 541 is of no consequence at this time.

Ejector E1, raised to ejecting position by the respective solenoid 267, becomes latched in its raised ejecting position by the ejector latch rod 273 on carriage 23 (see FIG. 9B). Latching occurs by reason of rearward swing of the pivot arms 275 for the latch rod 273. The extension 281 of the left-hand pivot arm 275 swings off operating arm 575 of switch 565 to throw the blade 569 of this switch on to its contact 573. This completes the starting circuit for the ejector drive motor 315, this circuit being from the positive connection at 731 through the motor, line 729, contact 573 and blade 569 of switch 565, line 733 and the cycle safety switch 661 (which is closed) to the negative connection at 735.

Figure 6:
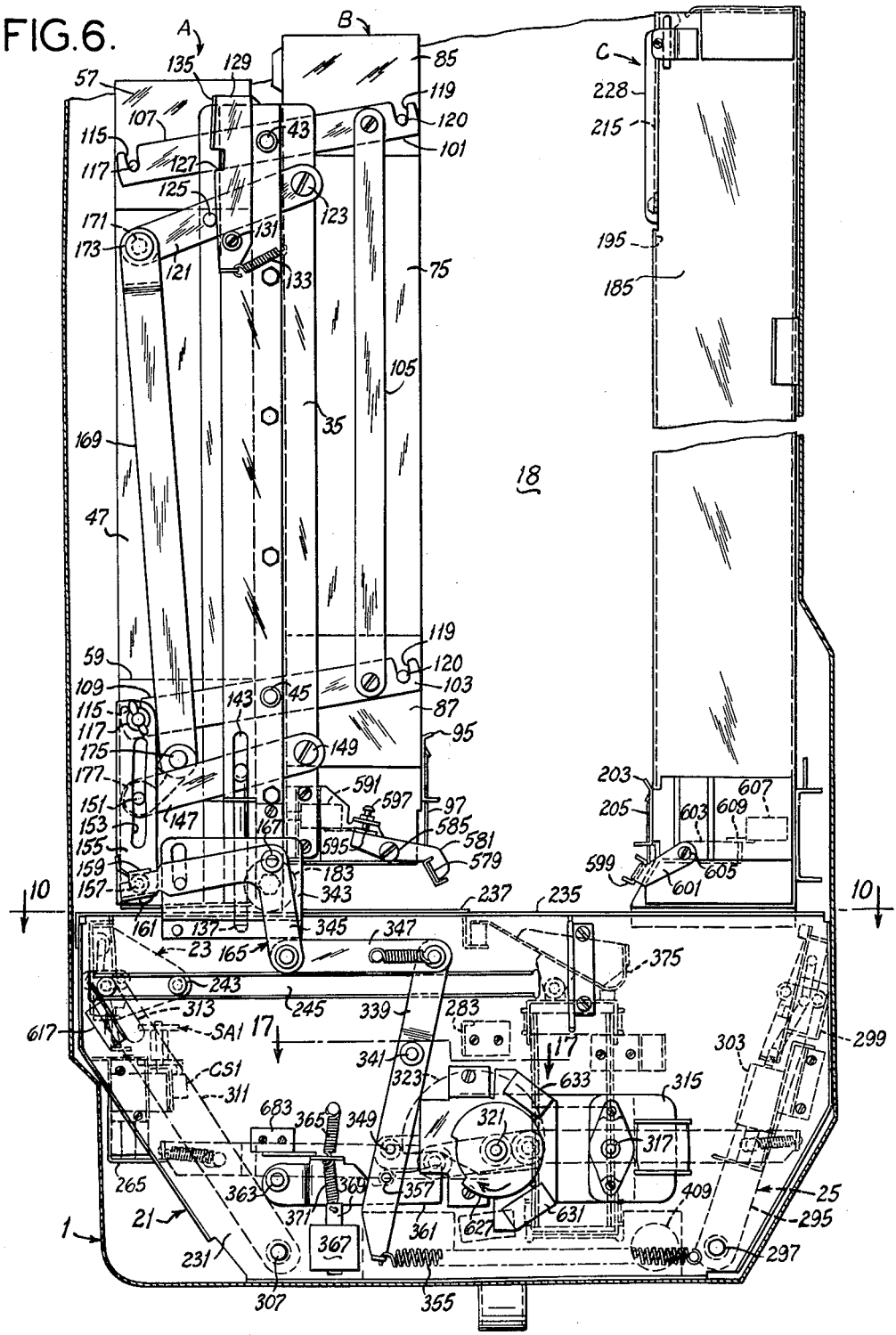
FIG. 6 is a vertical section taken generally on line 6—6 of FIG. 3, showing the first bank of columns and a second bank of columns of the vendor, with the first bank down and the second bank up.
Figure 17:
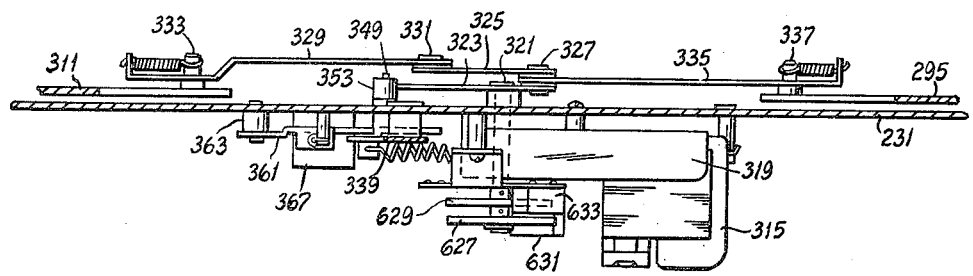
FIG. 17 is a horizontal section taken generally on line 17—17 of FIG. 6.
Figure 18:
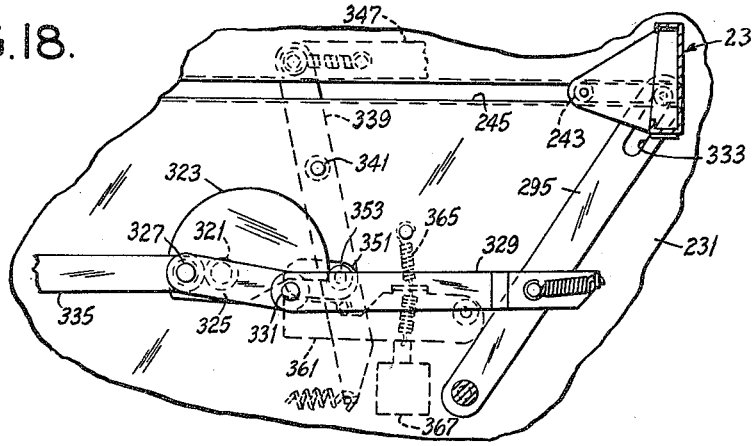
FIG. 18 is a fragmentary view taken generally on line 18—18 of FIG. 12.

Motor 315, thus started, drives shaft 321 clockwise as viewed in FIG. 6 (counterclockwise as viewed in FIG. 18). Cam 323 rotates with shaft 321. Link 329, connected between the end of crank arm 325 on the cam and arm 311, swings arm 311 rearward to drive ejector carriage 23 rearward. Link 335 acts to swing ejector carrier 25 forward, and blade 569 of switch 567 is thrown on to its contact 573. Since alternator switch CS1 is open, solenoid 367 is not energized. Accordingly, lever 339 remains latched in its FIG. 6 position by the latch 361, and no shift of banks A and B of columns occurs, bank A staying down and bank B staying up as shown in FIG. 6.

Upon rearward movement of the ejector carriage 23, holding switch 617 closes to establish the holding circuit for motor 315 to keep it in operation for a full vend cycle (a complete revolution of shaft 321 and cam 323). This holding circuit is from the positive connection at 731 through the motor and lines 729 and 737 and switch 617 (now closed) to the negative connection at 739.

The raised ejector E1, moving rearward with the carriage 23, pushes the lowermost pack P in column AC1 rearward through the rear ejection opening 65 of column AC1. The pack is pushed rearward on shelf 237 of assembly 21 underneath the bottom of column BC1 (which is raised up high enough to clear the way for the pack as shown in FIG. 6). As the pack is moved rearward, its rearward end engages the flap 579 and swings this flap up to open the switch 591. This occurs before blade 641 of switch 633 closes on contact 645, and the pack passes out from under the flap to reclose switch 591 after blade 641 of switch 633 has closed back on contact 643. The result is that empty signal lamp 765 and relay coil 749 are not energized.

The raised ejector E1, continuing its rearward movement with the ejector carriage 23, pushes the pack over the rear edge of shelf 237 and into the cradle or platform 375 of the elevator 27, which is lowered at this time as appears in solid lines in FIG. 2 (which shows a pack in place on the cradle or platform 375). As the ejector carriage 23 nears the end of its rearward ejecting stroke, pivot arm extensions 281 engage the trips 283, and arrest the ejector latch rod 273 while the ejector carriage 23 completes its rearward movement thereby in effect to swing the latch rod 273 from under the tongue 271 on the ejector E1. The latter drops down to its lowered retracted position (see FIG. 9A) and latch arms 287 latch the latch rod 273 in its retracted position to lock pivot arms 275 and their extensions 281 in their FIG. 9A position on the return stroke of the ejector carriage 23.

The circuit for solenoid 267 is completed through line 711, coin-handling apparatus 701, line 725, contact 571 and blade 569 of switch 567, line 727, contact 571 and blade 569 of switch 565, line 733 and switch 661 (which is closed) to 735. When blades 569 of switches 565 and 567 open off contacts 571, the solenoid 267 is deenergized.

The ejected pack having been pushed into the cradle or platform 375, switch 631 is closed by the action of cam 627 to start the motor of unit 439, thereby to raise the pack. The starting circuit for the motor of unit 439 is from connection 743 via blade 635 and contact 637 of switch 631, line 741, contact 653 and blade 651 of switch 647, line 757 (which includes the motor of unit 439), and contact 753 and blade 751 of relay 747 to the connection at 759. Solenoid 497, which is connected in parallel with the motor of unit 439, is simultaneously energized, and retracts the latch plate 461 to permit extension of the lazy tongs 383 under the bias of springs 415 and the power from the motor of unit 439. The latter acts to rotate lever 445 clockwise as viewed in FIG. 5 to pull links 451 and 453 inward thereby to slide pins 413 toward the inner ends of slots 411 for extending the lazy tongs. Upon extension of the lazy tongs, channel 417 and cradle 375 carried thereby move upward. As the left-hand pin 413 slides away from its FIG. 5 position and as the channel 417 moves upward from its FIG. 5 position, blade 651 of switch 647 is thrown on to contact 655, blade 663 of switch 659 is thrown on to contact 667, and switch 661 is opened. A holding circuit for the motor of unit 439 and the elevator unlatching solenoid 497 is established from the connection 777 via safety switch 673 (which is closed at this time), line 775 line 773, contact 655 and blade 651 of switch 647, line 757, and contact 753 and blade 751 of relay 747 to the connection at 759. Closure of blade 663 on contact 667 sends a signal back to the coin-handling apparatus for coin-handling purposes.

When lever 445 has rotated 180° from its FIG. 5 position, the lazy tongs 383 is fully extended (see FIG. 15 and the dotted line position of the lazy tongs shown in FIG. 2). The ends of the lip 381 on the cradle 375 engage the rollers 460, and the cradle is rocked counterclockwise on its pivots 423 against the bias of springs 425 to dump the pack onto the inclined rear end 11a of the delivery pan 11 (see FIG. 2). The pack slides down 11a over the top of banks A and B of columns to the delivery station D at the front of the pan, where it is presented to the purchaser at a height convenient for removal without the purchaser having to stoop over.

As the lever 445 passes the 180° point of its revolution, the stud 677 on the lever momentarily opens the safety switch 673. If a motor (not shown) in the coin-handling apparatus 701 is running at this time (as it should be), a pulse of current is transmitted from the coin-handling apparatus via line 773 to fill in for the momentary opening of switch 673, thereby to keep the motor of unit 439 energized until after switch 673 recloses as stud 677 wipes off its operating arm 675. If, however, the motor in the coin-handling apparatus fails (as by burning out, for example) no pulse is transmitted from the coin-handling apparatus when switch 673 opens, and the motor of unit 439 is deenergized to stop the elevator approximately at its upper limit of travel as a safety feature.

Assuming the motor in the coin-handling apparatus 701 is running, the motor of unit 439 is held in operation until lever 445 completes a revolution. As lever 445 rotates through the second half of its revolution, it acts to push out the links 451 and 453 to return pins 413 to the outer ends of slots 411 thereby to contract the lazy tongs and pull the channel 417 and cradle 375 back down to their FIG. 5 lowered position. Channel 417 acts to throw blade 651 of switch 647 back on to contact 653. The left-hand pin 413 acts to throw the blade 663 of switch 659 back on to contact 665 and to reclose the switch 661. Cam 627 has opened switch 631 by this time, so that the motor of unit 439 and solenoid 497 are deenergized. With solenoid 497 deenergized, spring 485 returns the latch plate 461 to latch the lazy tongs in its FIG. 5 contracted condition.

Cam 627 times the start of the operation of the elevator to occur somewhat after shaft 321 has rotated 180° from its 0° position. Thus, operation of the elevator occurs while the carriage 23 and carrier 25 are being returned to their respective retracted positions, and is completed before their return. When carriage 23 reaches its forward retracted position (see FIGS. 2 and 6), it acts to open the holding switch 617. This breaks the holding circuit for motor 315, and the latter stops after having driven shaft 321 through a single revolution. Also, the extensions 281 of the left-hand pivot arms 275 of the latch rods 273 on carriage 23 and carrier 25 act to throw the blades 569 of switches 565 and 567 back on to the contacts 571.

As above noted, it was assumed that alternator switch CS1 was open. This would be due to the button on the end of the operating arm 525 of switch CS1 being in one of the deep grooves 523 of the respective spool-shaped alternator SA1. When ejector E1 is raised as above described, the pawl 533 on the foot 257 thereof is raised into position for engagement with the ratchet 517 of alternator SA1. Then, in the course of rearward movement of the raised pawl with the carriage 23, the alternator SA1 is indexed 60° to effect closure of the alternator switch CS1 by engagement of the button on arm 525 of switch CS1 in a shallow groove 521 of the alternator. This conditions the vendor for upward shift of bank A and downward shift of bank B for ejection of the lowermost pack from column BC1 instead of AC1 the next time a purchaser deposits coin and actuates selector switch S1 to obtain a pack from paired columns AC1–BC1. With switch CS1 closed, this shift occurs immediately upon selector switch S1 being actuated, due to the bridging of contacts 551 and 555 of switch S1 by blade 541 of switch S1, thereby to complete a circuit for solenoid 367 via line 703, line 709 for switch S1, the respective line 713, contact 551, blade 541 and contact 555 of switch S1, the respective line 715 to blade 527 of alternator switch CS1, contact 529 of switch CS1, line 716, contact 687 and blade 685 of switch 683, line 719 (in which solenoid 367 is connected), contact 643 and blade 641 of switch 633, line 721, and contact 665 and blade 663 of switch 659 to the connection 723. When solenoid 367 is energized, blade 685 is closed on contact 689 to establish a holding circuit for solenoid 367 via connection 717, contact 689 and the blade 685 to line 719. Also, when solenoid 367 is energized, it pulls down latch 361 to release lever 339 to be swung counterclockwise as viewed in FIG. 6 by the shift spring 355. This rocks bell crank 165 clockwise as viewed in FIG. 6 to shift bank A up and bank B down to their FIG. 7 position. This shift occurs before the raised ejector E1 has moved rearward any substantial amount, so that it simply passes under the raised column AC1 of bank A and pushes out the lowermost pack of column BC1 of bank B. Pawl 533 on the foot of ejector E1 indexes the alternator SA1 another 60° to open alternator switch CS1 for the next vend cycle involving the paired columns AC1–BC1. The holding circuit for solenoid 367 is broken when blade 641 of switch 633 opens off contact 643, and this enables latch 361 to swing back up. Cam 323, during the second half of its revolution, acts on follower roller 349 on lever 339 to return the latter and the bell crank 165 to their initial position for bringing bank A back down and bank B back up so that each vend cycle starts with bank A down and bank B up.

If columns AC1 and BC1 had been empty, the raised ejector E1 would have simply swept through without pushing a pack. Under these circumstances, flap 579 would not have been swung up to open switch 591, and the latter would have remained closed. When blade 641 of switch 633 closed on contact 645 under the control of cam 629, a circuit for relay 747 and empty signal lamp 765 would have been completed from connection 723 via blade 663 and contact 665 of switch 659, line 721, blade 641 and contact 645 of switch 633, line 763, switches 591 and 607 (both closed), line 73, coil 749, line 761 and switch 617 (closed at this time) to the connection at 739. On energization of relay coil 749, blade 751 of relay 747 would have been thrown off contact 753 to break the circuit for the motor of the elevator operating unit 439 and the solenoid 497 and closed on contact 755 to establish a holding circuit for the relay coil 749 and empty signal lamp 765 via connection 759 and blade 751. Thus, under these circumstances, operation of the elevator would have been cancelled, with attendant cancellation of operation of switch 659 to send a signal back to the coin-handling apparatus 701. The effect of this is to hold the deposited coin or coins in escrow so that the purchaser, being apprised by the lamp 765 that columns AC1 and BC1 are empty, may obtain return of his coin or coins or make another selection.

Assuming a purchaser deposits coin in the amount of the medium price and actuates selector switch S2 to obtain a pack of cigarettes of the brand stocked in paired columns AC2–BC2, operation is substantially the same as that described above except that the solenoid 267 for ejector E2 is energized from line 705 to raise ejector E2 and the alternator SA2 for alternator switch CS2 is indexed by the pawl 533 on the foot of ejector E2.

Assuming a purchaser deposits coin in the amount of the low price and actuates selector switch S7 to obtain a pack of cigarettes of the brand stocked in paired columns AC7–BC7, operation is substantially the same as that above described except that the solenoid 267 for ejector E7 is energized from line 707 to raise ejector E7 and the alternator SA7 for alternator switch CS7 is indexed by the pawl 533 on the foot of ejector E7.

Operation on actuation of any of selector switches S3–S6 for the other pairs of columns AC3–BC3, AC4–BC4, AC5–BC5 and AC6–BC6 will be readily understood from the above.

Operation on actuation of any one of selector switches S8–S11 for the single columns AC8–AC11 is essentially the same as above described for operation on actuation of selector switch S1 except, of course, that there are no alternator switches CS associated with these columns, and the circuit for the solenoid 267 of each of these columns is completed by the single blade 545 of the respective selector switch S8–S11 bridging the respective contacts 553 and 559 on the circuit board 549. Thus, no shift of banks A and B occurs as a result of actuation of any of selector switches S8–S11.

Now, it will be assumed that a purchaser deposits coins in the amount of the high price and actuates selector switch S22 to obtain a pack of cigarettes of the brand stocked in column CC11 of the rear bank C of columns, and that there are packs in this column. Blade 545 of selector switch S22 completes a circuit for the respective solenoid 303 by bridging the contacts 553 and 559 of switch S22 and the plunger of this solenoid is driven upward to raise the ejector F11 associated with column CC11. Ejector F11 is latched in its raised ejecting position by the ejector latch rod 273 on carrier 25. The extension 281 of the left-hand pivot arm 275 of this latch rod swings off operating arm 577 of switch 567. This completes the starting circuit for the ejector drive motor 315, this circuit being from the positive connection at 731 through the motor, line 729, contact 573 and blade 569 of switch 567, line 727, contact 571 and blade 569 of switch 565, line 733, and switch 661 to the negative connection at 735.

Operation then proceeds in a manner similar to that described above upon actuation of selector switch S1, except that ejector F11 is raised instead of ejector E1. The raised ejector F11, moving forward with the ejector carrier 25, pushes the lowermost pack in column CC11 forward through the forward ejection opening 201 of column CC11, and the ejected pack drops into the cradle 375. As the pack is moved forward, its forward end engages the flap 599 and swings this flap up to open the switch 607. This occurs before blade 641 of switch 633 closes on contact 645, and the pack passes out from under flap 599 to reclose switch 607 after blade 641 of switch 633 has closed back on contact 643. The result is that empty signal lamp and relay coil 749 are not energized. As the ejector carrier 25 nears the end of its forward ejecting stroke, the respective pivot arm extensions 281 engage the trips 283a to effect release of ejector F11 so that it drops down to its lowered retracted position and becomes locked therein by the respective notched rocker arms 287.

The ejected pack having been pushed forward into the cradle 375 by the ejector F11, the elevator is raised to deliver the pack to the delivery station and then lowered in the same manner as that described above upon actuation of selector switch S1. Carrier 25 returns to retracted position; carriage 23 also returns to retracted position.

If column CC11 had been empty, the raised ejector F11 would have simply swept through without pushing a pack. Under these circumstances, flap 599 would not have been swung up to open switch 607, and the latter would have remained closed. Accordingly, when blade 641 of switch 633 closed on contact 645 under the control of cam 629, a circuit for relay 747 and empty signal lamp 765 would have been completed in the same manner above described in respect to operation on actuation of selector switch S1 when columns AC1–BC1 are empty, and operation of the elevator would have similarly been cancelled.

Operation on actuation of any of selector switches S12–S21 for the other rear columns CC1–CC10 corresponds to the operation on actuation of selector switch S22, and will be readily understood from the above.

It will be observed that with banks of columns at the front and banks of columns at the rear and with the elevator therebetween, a relatively large number of columns may be provided in a cabinet of reasonable width. For example, as herein illustrated, there are columns for twenty-two different brands in a cabinet only slightly wider than a bank of eleven columns. Despite the high-level delivery, each column is relatively tall for high capacity. The elevator, comprising the single cradle or platform 375 extending the full width of the banks of columns between banks B and C, serves both the banks at the front and the banks at the rear. Moreover, with the elevator located rearward of banks A and B, it is substantially protected against being jammed by vandals. If, for example, the elevator travelled up and down in what would amount to an elevator shaft at the front of the machine in front of the columns, it would be relatively easy for vandals to throw objects into the elevator shaft which might jam the elevator.

With ejector lifter solenoids 267 and 303 fixed in position in assembly 21, flexing connections thereto are not required. If the solenoids were mounted on and movable with ejector carriage 23 and carrier 25, such connections would be required, with the attendant possibility of breakage due to fatigue.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A vendor comprising a cabinet having a front and a rear, a bank of columns in the cabinet, said bank extending transversely in the cabinet and said columns being located side-by-side in the bank, each column being adapted to hold a stack of items to be vended and adapted for rearward ejection of the lowermost item of the stack therein, the cabinet having a delivery station at the front above the bottom of the bank of columns and at a level convenient for removal of an item from the delivery station by a purchaser, means for selectively ejecting the lowermost item rearward from any column comprising a plurality of ejectors, one for each column, and an elevator extending from side-by-side of said bank of columns at the rear thereof and mounted for movement in the cabinet between a lowered position for receiving an item ejected rearward from any column and a raised position at a level above the top of the bank of columns for delivery of the item over the top of the bank of columns to the delivery station.

2. A vendor comprising a cabinet having a front and a rear, a front bank of columns in the cabinet, said bank extending transversely in the cabinet and the columns in the front bank being located side-by-side in the front bank, each column in the front bank being adapted to hold a stack of items to be vended and adapted for rearward ejection of the lowermost item of the stack therein, a rear bank of columns in the cabinet, said rear bank extending transversely in the cabinet space rearward of the front bank and the columns in the rear bank being located side-by-side in the rear bank, each column in the rear bank being adapted to hold a stack of items to be vended and adapted for forward ejection of the lowermost item of the stack therein, the cabinet having a delivery station at the front above the bottom of the banks of columns and at a level convenient for removal of an item from the delivery station by a purchaser, means for selectively ejecting the lowermost item rearward from any one of the columns in the front bank and forward from any one of the columns in the rear bank, and means for delivering an item ejected from any column to said delivery station.

3. A vendor as set forth in claim 2 wherein said delivering means comprises an elevator extending from side-to-side of the front and rear banks of columns in the space therebetween and mounted for movement in said space between a lowered position for receiving an item ejected from any column and a raised position for delivery of the item over the top of the front bank of columns to the delivery station.

4. A vendor comprising a pair of columns each adapted to hold a stack of items to be vended and each adapted for ejection of the lowermost item of the stack therein, said columns being adapted to be stocked with identical items, a single ejector common to both columns movable to eject the lowermost item from either column, said column being located above the ejector and each being shiftable up and down generally vertically between a lowered position for ejection of the lowermost item of the stack therein by the ejector and a raised retracted position clear of the ejector, and means for effecting reverse shifting of said columns to lower either column for ejection therefrom with accompanying raising of the other column after each ejection of an item from the latter for vending items alternately from said columns on successive ejections by said ejector.

5. A vendor comprising first and second banks of columns, the columns in each bank being located side-by-side in the respective bank, each column being adapted to hold a stack of items to be vended and each adapted for ejection of the lowermost item of the stack therein, each column in one of said banks being paired with a column in the other bank and each respective pair of columns being adapted to be stocked with identical items, means for selectively ejecting the lowermost item from one or the other of each column of any of said pairs of columns comprising a carrier and plurality of ejectors carried by the carrier, one ejector for each of the pairs of columns, each ejector being carried by the carrier for movement between a retracted position and an ejecting position, said carrier being movable on a vend cycle of the vendor to move an ejector in ejecting position to eject the lowermost item from one or the other of the two columns of the respective pair of columns, said first and second banks being located above said carrier and each being shiftable between a lowered position for ejection of the lowermost item of a column therein by the respective ejector and a raised retracted position clear of all the ejectors, and means for effecting reverse shifting of said first and second banks to lower either column of a respective pair of columns for ejection therefrom with accompanying raising of the other coluumn of the respective pair for vending items alternately from the columns of each pair on successive ejections by the respective ejector.

6. A vendor comprising a cabinet, first and second banks of columns in the cabinet, each bank extending transversely in the cabinet and the columns in each bank being located side-by-side in the respective bank, each column being adapted to hold a stack of items to be vended and each adapted for ejection of the lowermost item of the stack therein, each column in one of said banks being paired with a column in the other bank and each respective pair of columns being adapted to be stocked with identical items, the cabinet having a delivery station above the bottom of the columns and at a level convenient for removal of an item from the delivery station by a purchaser, means for selectively ejecting the lowermost item from one or the other of each column of any of said pairs of columns comprising a carrier and a plurality of ejectors carried by the carrier, one ejector for each of the pairs of columns, each ejector being carried by the carrier for movement between a retracted position and an ejecting position, said carrier being movable on a vend cycle of the vendor to move an ejector in ejecting position to eject the lowermost item from one or the other of the two columns of the respective pair of columns, said first and second banks being located above said carrier and each being shiftable between a lowered position for ejection of the lowermost item of a column therein by the respective ejector and a raised retracted position clear of all the ejectors, means for effecting reverse shifting of said first and second banks to lower either column of a respective pair of colunms for ejection therefrom with accompanying raising of the other column of the respective pair for vending items alternately from the columns of each pair on successive ejections by the respective ejector, and means for delivering an item ejected from any column to said delivery station.

7. A vendor as set forth in claim 6 wherein said delivering means comprises an elevator extending from side-to-side of said banks of columns and mounted for movement in the cabinet between a lowered position for receiving an item ejected from any column and a raised position for delivery of the item to the delivery station.

8. A vendor comprising a cabinet having a front and a rear, first and second banks of columns in the cabinet toward the front thereof, each extending transversely in the cabinet, the second bank being directly rearward of the first bank, the columns in each of said first and second banks being located side-by-side in the respective bank, each column in said first and second banks being adapted to hold a stack of items to be vended and each adapted for rearward ejection of the lowermost item of the stack therein, each column in the second bank being located directly rearward of a respective column in the first bank and being paired therewith and each respective pair of columns in the first and second banks being adapted to be stocked with identical items, the cabinet having a delivery station at the front above the bottom of the banks of columns and at a level convenient for removal of an item from the delivery station by a purchaser, means for selectively ejecting the lowermost item rearward from one or the other of each column of any of said pairs of columns of the first and second banks comprising a first carrier and a plurality of rearward-acting ejectors carried by the first carrier, one ejector for each of the pairs of columns in the first and second banks, each of said rearward-acting ejectors being carried by the first carrier for movement between a lowered retracted position and a raised ejecting position, said first carrier being movable rearward from a forward retracted position on a vend cycle of the vendor to move any raised rearward-acting ejector thereof rearward to eject the lowermost item from one or the other of the two columns of the respective pair of columns of the first and second banks, said first and second banks being located above said first carriage and each being shiftable between a lowered position for ejection of the lowermost item of a column therein by the respective ejector and a raised retracted position clear of all the ejectors, means for effecting reverse shifting of said first and second banks of columns to lower either column of a respective pair of columns for ejection therefrom with accompanying raising of the other column of the respective pair for vending items alternately from the columns of each pair on successive ejections by the respective ejector, and means for delivering an item ejected from any column to said delivery station.

9. A vendor as set forth in claim 8 wherein said delivering means comprises an elevator extending from side-by-side of said first and second banks of columns at the rear thereof and mounted for movement in the cabinet between a lowered position for receiving an item ejected rearward from any column and a raised position at a level above the top of the first and second banks of columns for delivery of the item over the top of the first and second banks to the delivery station.

10. A vendor comprising a cabinet having a front and a rear, first and second banks of columns in the cabinet toward the front thereof, each extending transversely in the cabinet, the second bank being directly rearward of the first bank, the columns in each of said first and second banks being located side-by-side in the respective bank, each column in said first and second banks being adapted to hold a stack of items to be vended and each adapted for rearward ejection of the lowermost item of the stack therein, each column in the second bank being located directly rearward of a respective column in the first bank and being paired therewith and each respective pair of columns in the first and second banks being adapted to be stocked with identical items, a third bank of columns in the cabinet, said third bank extending transversely in the cabinet spaced rearward of the scond bank and the columns in said third bank being located side-by-side in said third bank, each column in the third bank being adapted to hold a stack of items to be vended and being adapted for forward ejection of the lowermost item of the stack therein, the cabinet having a delivery station at the front above the bottom of the banks of columns and at a level convenient for removal of an item from the delivery station by the purchaser, means for selectively ejecting the lowermost item rearward from one or the other of each column of any of said pairs of columns of the first and second banks comprising a first carrier and a plurality of rearward-acting ejectors carried by the first carrier, one ejector for each of the pairs of columns in the first and second banks, each of said rearward-acting ejectors being carried by the first carrier for movement between a lowered retracted position and a raised ejecting position, said first carrier being movable rearward from a forward retracted position on a vend cycle of the vendor to move any raised rearward-acting ejector thereof rearward to eject the lowermost item from one or the other of the two columns of the respective pair of columns of the first and second banks, said first and second banks being located above said first carrier and each being shiftable between a lowered position for ejection of the lowermost item of a column therein by the respective ejector and a raised retracted position clear of all the ejectors, means for effecting reverse shifting of said first and second banks of columns to lower either column of a respective pair of columns for ejection therefrom with accompanying raising of the other column of the respective pair for vending items alternately from the columns of each pair on successive ejections by the respective ejector, means for selectively ejecting the lowermost item from a column of the third bank comprising a second carrier and a plurality of forward-acting ejectors carried by the second carrier, one for each of the columns in the third bank, each of said forward-acting ejectors being carried by the second carrier for movement between a lowered retracted position and a raised ejecting position, said second carrier being movable forward from a rearward retracted position on a vend cycle of the vendor to move any raised forward-acting ejector thereof forward to eject the lowermost item from the respective column of the third bank, and means for delivering an item ejected from any column to said delivery station.

11. A vendor as set forth in claim 10 wherein said delivering means comprises an elevator extending from side-to-side of the banks in the space between the second and third banks and mounted for movement in said space between a lowered position for receiving an item ejected from any column and a raised position for delivery of the item over the top of the first and second banks to the delivery station.

12. A vendor comprising a cabinet, first and second banks of columns in the cabinet, each bank extending transversely in the cabinet and the columns in each bank being located side-by-side in the respective bank, each column being adapted to hold a stack of items to be vended and each adapted for ejection of the lowermost item of the stack therein, each column in one of said banks being paired with a column in the other bank and each respective pair of columns being adapted to be stocked with identical items, means for selectively ejecting the lowermost item from one or the other of each column of any of said pairs of columns comprising a carrier and a plurality of ejectors carried by the carrier, one ejector for each of the pairs of columns, each ejector being carried by the carrier for movement between a retracted position and an ejecting position, said carrier being movable on a vend cycle of the vendor to move an ejector in ejecting position to eject the lowermost item from one or the other of the two columns of the respective pair of columns, lever means in said cabinet supporting said first and second banks in position above said carrier and interconnecting said banks for downward shift of the first bank to a lowered position for ejection of the lowermost item of a column therein by the respective ejector and accompanying upward shift of the second bank to a raised retracted position clear of all the ejectors, and for downward shift of the second bank to a lowered position for ejection of the lowermost item of a column therein by the respective ejector and accompanying upward shift of the first bank to a raised retracted position clear of all the ejectors, and means for effecting reverse shifting of said first and second banks to lower either column of a respective pair of columns for ejection therefrom with accompanying raising of the other column of the respective pair for vending items alternately from the columns of each pair on successive ejections by the respective ejector.

13. A vendor as set forth in claim 12 wherein said lever means comprises an upper and a lower rock shaft extending transversely in the cabinet between said first and second banks, arms extending forward from said shafts carrying said first bank, and arms extending rearward from said shafts supporting said second bank.

14. A vendor comprising a cabinet having a front door, an ejector-elevator assembly in the cabinet at the bottom thereof, a bank of columns extending transversely in the cabinet above said ejector-elevator assembly, said columns being located side-by-side in the bank, each column being adapted to hold a stack of items to be vended and adapted for rearward ejection of the lowermost item of the stack therein, the front door of the cabinet having a delivery station above the bottom of the bank of columns and at a level convenient for removal of an item from the delivery station by a purchaser, said ejector-elevator assembly including means for selectively ejecting the lowermost item rearward from any one of said columns comprising a carrier and a plurality of rearward-acting ejectors carried by the carrier, one ejector for each column, each ejector being carried by the carrier for movement between a lowered retracted position and a raised ejecting position, said carrier being movable rearward from a forward retracted position to move any raised ejector rearward to eject the lowermost item from the respective column, said ejector-elevator assembly further including an elevator normally occupying a lowered position in said assembly rearward of said bank of columns for receiving an item ejected rearward from any column and movable upward behind said bank to a raised position for delivery of the item over the top of said bank to said delivery station.

15. A vendor as set forth in claim 14 having a series of ejector lifters, one for each ejector, mounted in said assembly in fixed relation to said carrier and each operable on the respective ejector when the carrier is in its forward retracted position for raising the respective ejector.

16. A vendor as set forth in claim 14 wherein said elevator comprises a lazy tongs acting in a generally vertical plane at the rear of said bank of columns and generally parallel to the plane of said bank of columns, said lazy tongs having its lower end mounted in said assembly and carrying a platform at its upper end, and means in said assembly for extending and contracting the lazy tongs to effect raising and lowering of the platform.

17. A vendor comprising a cabinet having a front door, an ejector-elevator assembly in the cabinet at the bottom thereof, a gate pivoted on a generally vertical axis at one side and toward the front of the cabinet for swinging movement toward a closed position behind the front door and above said ejector-elevator assembly and an open position extending out of the front of the cabinet, a front bank of columns carried by the gate extending transversely in the cabinet, said columns being located side-by-side and each being adapted to hold a stack of items to be vended and adapted for rearward ejection of the lowermost item of the stack therein, a rear bank of columns extending transversely in the cabinet above said ejector-elevator assembly spaced rearward of said front bank and the columns in said rear bank being located side-by-side in said rear bank, each column in the rear bank being adapted to hold a stack of items to be vended and being adapted for forward ejection of the lowermost item of the stack therein, the front door of the cabinet having a delivery station above the bottom of the banks of columns and at a level convenient for removal of an item from the delivery station by a purchaser, said ejector-elevator assembly including means for selectively ejecting the lowermost item rearward from any one of the columns of the front bank comprising a first carrier and a plurality of rearward-acting ejectors carried by the first carrier, one ejector for each of the columns in the front bank, each of said rearward-acting ejectors being carried by the first carrier for movement between a lowered retracted position and a raised ejecting position, said first carrier being movable rearward from a forward retracted position to move any raised rearward-acting ejector thereof rearward to eject the lowermost item from the respective column of the front bank, said ejector-elevator assembly further including means for selectively ejecting the lowermost item forward from a column of the rear bank comprising a second carrier and a plurality of forward-acting ejectors carried by the second carrier, one for each of the columns in the rear bank, each of said forward-acting ejectors being carried by the second carrier for movement between a lowered retracted position and a raised ejecting position, said second carrier being movable forward from a rearward retracted position to move any raised forward-acting ejector thereof forward to eject the lowermost item from the respective column of the rear bank, and said ejector-elevator assembly further comprising an elevator normally occupying a lowered position in said assembly for receiving an item ejected from any column and movable upward in the space between the front and rear banks to a raised position for delivery of the item over the top of the front bank to the delivery station.

18. A vendor as set forth in claim 17 having a first series of ejector lifters, one for each rearward-acting ejector, and a second series of ejector lifters, one for each forward-acting ejector, each lifter being mounted in said assembly in fixed relation to said carriers and each operable on the respective ejector when the respective carrier is in its retracted position for raising the respective ejector.

19. A vendor as set forth in claim 17 wherein said elevator comprises a lazy tongs acting in a generally vertical plane in the space between said front and rear banks of columns and generally parallel to said banks, said lazy tongs having its lower end mounted in said assembly and carrying a platform at its upper end, and means in said assembly for extending and contracting the lazy tongs to effect raising and lowering of the platform.

20. A vendor comprising a cabinet having a front door, an ejector-elevator assembly in the cabinet at the bottom thereof, a gate pivoted on a generally vertical axis at one side and toward the front of the cabinet for swinging movement between a closed position behind the front door and above said ejector-elevator assembly and an open position extending out of the front of the cabinet, first and second banks of columns carried by the gate, each bank extending transversely in the cabinet, the second bank being directly rearward of the first bank, the columns in each of said first and second banks being located side-by-side in the respective bank, each column in said first and second banks being adapted to hold a stack of items to be vended and each adapted for rearward ejection of the lowermost item of the stack therein, each column in the second bank being located directly rearward of a respective column in the first bank and being paired therewith and each respective pair of columns in the first and second banks being adapted to be stocked with identical items, a third bank of columns in the cabinet, said third bank extending transversely in the cabinet above said ejector-elevator assembly spaced rearward of the second bank and the columns in said third bank being located side-by-side in said third bank, each column in the rear bank being adapted to hold a stack of items to be vended and being adapted for forward ejection of the lowermost item of the stack therein, the front door of the cabinet having a delivery station above the bottom of the banks of columns and at a level convenient for removal of an item from the delivery station by a purchaser, said ejector-elevator assembly including means for selectively ejecting the lowermost item rearward from one or the other of each column of any of said pairs of columns of the first and second banks comprising a first carrier and a plurality of rearward-acting ejectors carried by the first carrier, one ejector for each of the pairs of columns in the first and second banks, each of said rearward-acting ejectors being carried by the first carrier for movement between a lowered retracted position and a raised ejecting position, said first carrier being movable rearward from a forward retracted position on a vend cycle of the vendor to move any raised rearward-ejector thereof rearward to eject the lowermost item from one or the other of the two columns of the respective pair of columns of the first and second banks, each of said first and second banks being mounted on the gate for shifting between a lowered position for ejection of the lowermost item of a column therein by the respective ejector and a raised retracted position clear of all the ejectors, means for effecting reverse shifting of said first and second banks of columns to lower either column of a respective pair of columns for ejection therefrom with accompanying raising of the other column of the respective pair for vending items alternately from the columns of each pair of successive ejections by the respective ejector, said ejector-elevator assembly further including means for selectively ejecting the lowermost item forward from a column of the third bank comprising a second carrier and a plurality of forward-acting ejectors carried by the second carrier, one for each of the columns in the third bank, each of said forward-acting ejectors being carried by the second carrier for movement between a lowered retracted position and a raised ejecting position, said second carrier being movable forward from a rearward retracted position on a vend cycle of the vendor to move any raised forward-acting ejector thereof forward to eject the lowermost item from the respective column of the third bank, and said ejector-elevator assembly further comprising an elevator normally occupying a lowered position in said assembly for receiving an item ejected from any column and movable upward in the space between the second and third banks to a raised position for delivery of the item over the top of the first and second banks to the delivery station.

21. A vendor as set forth in claim 20 having a first series of solenoids, one for each rearward-acting ejector, for raising the rearward-acting ejectors, and a second series of solenoids, one for each forward-acting ejector, for raising the forward-acting ejectors, each solenoid being mounted in said assembly in fixed relation to said carriers and each having a plunger engageable with the respective ejector when the respective carrier is in its retracted position for raising the respective ejector.

22. A vendor as set forth in claim 20 wherein said elevator comprises a lazy tongs acting in a generally vertical plane in the space between the second and third banks of columns and generally parallel to said banks, said lazy tongs having its lower end mounted in said assembly and carrying a platform at its upper end, and means in said assembly for extending and contracting the lazy tongs to effect raising and lowering of the platform.

23. In a vendor, a plurality of side-by-side columns each adapted to hold a stack of items to be vended and each adapted for ejection therefrom of the lowermost item therein, an ejector carrier movable through an ejecting stroke away from a retracted position and back to retracted position through a return stroke, a plurality of ejectors, one for each column, carried by the carrier for movement with the carrier as it moves away from and back to retracted position and also for movement relative to the carrier between a lowered retracted position and a raised ejecting position, a series of ejector lifters, one for each ejector, fixed relative to the carrier and each operable on the respective ejector when the carrier is in its retracted position for raising the respective ejector, and means for holding in raised position any ejector raised by the respective lifter as the carrier moves away from its retracted position through an ejecting stroke thereby to eject the lowermost item from the respective column and for returning the ejector to lowered position for the return stroke of the carrier.

24. In a vendor as set forth in claim 23, each of said lifters comprising a solenoid having a plunger engageable with the respective lifter when the carrier is in its retracted position, said carrier moving away from the solenoids on its ejecting stroke.

25. In a vendor as set forth in claim 24, said means comprising latch means carried by the carrier for latching in raised position any ejector raised by the respective lifter, and means for releasing said latch means for return of the raised ejector to lowered position as the carrier completes an ejecting stroke.

26. A vendor comprising a cabinet, a plurality of columns located side-by-side in the cabinet each adapted to hold a stack of items to be vended and adapted for ejection of the lowermost item of the stack therein, the cabinet having a delivery station above the bottom of the columns and at a level convenient for removal of an item from the delivery station by a purchaser, means for selectively ejecting the lowermost item from any column comprising a plurality of ejectors, one for each column, and an elevator comprising a lazy tongs acting in a generally vertical plane adjacent and generally parallel to the plane of the columns and carrying a platform extending from side-to-side of the columns, and means for operating the lazy tongs for movement of the platform between a lowered position for receiving an item ejected from any column and a raised position for delivery of the item to the delivery station.

27. A vendor comprising a cabinet having a front and a rear, a bank of columns in the cabinet, said bank extending transversely in the cabinet and said columns being located side-by-side in the bank, each column being adapted to hold a stack of items to be vended and adapted for rearward ejection of the lowermost item of the stack therein, the cabinet having a delivery station at the front above the bottom of the bank of columns and at a level convenient for removal of an item from the delivery station by a purchaser, means for selectively ejecting the lowermost item rearward from any column comprising a plurality of ejectors, one for each column, and an elevator comprising a lazy tongs acting in a generally vertical plane at the rear of said bank of columns and generally parallel to the plane of said bank of columns and carrying a platform extending from side-by-side of said bank of columns, and means for operating the lazy tongs for movement of the platform between a lowered position for receiving an item ejected rearward from any column and a raised position at a level above the top of the bank of columns for delivery of the item over the top of the bank of columns to the delivery station.

28. A vendor comprising a cabinet having a front and a rear, a front bank of columns in the cabinet, said front bank extending transversely in the cabinet and the columns in the front bank being located side-by-side in the front bank, each column in the front bank being adapted to hold a stack of items to be vended and adapted for rearward ejection of the lowermost item of the stack therein, a rear bank of columns in the cabinet, said rear bank extending transversely in the cabinet spaced rearward of the front bank and the columns in the rear bank being located side-by-side in the rear bank, each column in the rear bank being adapted to hold a stack of items to be vended and adapted for forward ejection of the lowermost item of the stack therein, the cabinet having a delivery station at the front above the bottom of the banks of columns and at a level convenient for removal of an item from the delivery station by a purchaser, means for selectively ejecting the lowermost item rearward from any one of the columns in the front bank and forward from any one of the columns in the rear bank, and an elevator comprising a lazy tongs acting in a generally vertical plane in the space between said front and rear banks of columns and generally parallel to said banks of columns and carrying a platform extending from side-to-side of the banks of columns, and means for extending and contracting the lazy tongs for movement of the platform between a lowered position for receiving an item ejected from any column and a raised position for delivery of the item over the top of the front bank of columns to the delivery station.

29. A vendor as set forth in claim 28 having spring means for initiating extension of the lazy tongs, motor-driven means for extending and contracting the lazy tongs, and means for releasably latching the lazy tongs in contracted condition to hold the platform in its lowered item-receiving position.

30. A vendor as set forth in claim 14 in which the ejector-elevator assembly is removably mounted in the cabinet.

31. A vendor comprising a cabinet having a front door, a plurality of columns located side-by-side in the cabinet, each column being adapted to hold a stack of items to be vended and adapted for ejection of the lowermost item of the stack, means for selectively ejecting the lowermost item from any one of said columns, each column extending up to the top of the cabinet, each column having a loading side and a flange at the side for confining the items in the column, the flange of each column terminating short of the upper end of the column to provide an opening for loading items into the column from said loading side and a closure for each said loading opening, each closure being laterally slidable away from a closed position in front of the respective loading opening to an open position clearing said loading opening, means biasing each closure to its closed position, and means on each closure engageable by an item or items held in the hand of a person loading the respective column for sliding the closure laterally to its open position.

32. A vendor as set forth in claim 31 wherein the closures for two adjacent columns are constituted by a single member slidable laterally in one direction to clear the loading opening of one of said two adjacent columns and slidable laterally in the opposite direction to clear the loading opening of the other of said two columns.

References Cited by the Examiner

UNITED STATES PATENTS

| | | | |
|---|---|---|---|
| 918,886 | 4/09 | Mills | 221—188 X |
| 1,218,242 | 3/17 | Davis | 221—190 X |
| 3,002,602 | 10/61 | Giepen | 221—225 X |

LOUIS J. DEMBO, Primary Examiner.

HADD S. LANE, Examiner.